US012452776B2

(12) United States Patent
Talebi Fard et al.

(10) Patent No.: US 12,452,776 B2
(45) Date of Patent: Oct. 21, 2025

(54) RELAY NODE SELECTION

(71) Applicant: Ofinno, LLC, Reston, VA (US)

(72) Inventors: Peyman Talebi Fard, Vienna, VA (US);
Kyungmin Park, Vienna, VA (US);
Esmael Hejazi Dinan, McLean, VA (US); Jinsook Ryu, Oakton, VA (US);
Taehun Kim, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 308 days.

(21) Appl. No.: 17/866,948

(22) Filed: Jul. 18, 2022

(65) Prior Publication Data

US 2022/0353799 A1    Nov. 3, 2022

Related U.S. Application Data

(63) Continuation of application No. PCT/US2021/013827, filed on Jan. 18, 2021.

(60) Provisional application No. 62/963,130, filed on Jan. 19, 2020.

(51) Int. Cl.
*H04W 48/16* (2009.01)
*H04W 8/00* (2009.01)
*H04W 76/10* (2018.01)
*H04W 88/04* (2009.01)

(52) U.S. Cl.
CPC ........... *H04W 48/16* (2013.01); *H04W 8/005* (2013.01); *H04W 76/10* (2018.02); *H04W 88/04* (2013.01)

(58) Field of Classification Search
CPC ..... H04W 48/16; H04W 48/18; H04W 48/02; H04W 84/105; H04W 12/76; H04W 48/08; H04W 48/10; H04W 76/14; H04W 76/15; H04W 8/005; H04W 84/045; H04W 76/11
See application file for complete search history.

(56) References Cited

U.S. PATENT DOCUMENTS

| | | | |
|---|---|---|---|
| 2019/0387429 A1* | 12/2019 | Basu Mallick | H04W 28/0289 |
| 2021/0051566 A1 | 2/2021 | Tiwari et al. | |
| 2021/0400448 A1 | 12/2021 | Adjakple et al. | |
| 2022/0007274 A1* | 1/2022 | Jin | H04W 48/10 |
| 2022/0078698 A1 | 3/2022 | Geng et al. | |
| 2022/0132626 A1 | 4/2022 | Xu et al. | |
| 2022/0264435 A1* | 8/2022 | Yang | H04W 48/08 |
| 2022/0338283 A1* | 10/2022 | Wang | H04W 76/14 |
| 2022/0369215 A1* | 11/2022 | Dees | H04W 76/14 |
| 2023/0023639 A1* | 1/2023 | Shi | H04W 88/04 |

FOREIGN PATENT DOCUMENTS

| | | |
|---|---|---|
| WO | 2019/031865 A1 | 2/2019 |
| WO | 2021/092480 A1 | 5/2021 |

OTHER PUBLICATIONS

C1-198164; 3GPP TSG-CT WG1 Meeting #121; Reno (NV), USA, Nov. 11-15, 2019; Source: Ericsson; Title: Completion of UE-requested V2X policy provisioning procedure; Spec: 3GPP TS 24.587 v0.3.0; Agenda item: 16.2.13; Document for: Agreement.

(Continued)

*Primary Examiner* — Awet Haile
(74) *Attorney, Agent, or Firm* — Peter Flanagan; Kavon Nasabzadeh; Jacob L. Mangan

(57) ABSTRACT

A first wireless device transmits, to a second wireless device, a discovery message comprising a non-public network (NPN) identifier of an NPN to which the first wireless device can provide access.

20 Claims, 31 Drawing Sheets

(56) References Cited

OTHER PUBLICATIONS

R2-1702954; 3GPP TSG-RAN WG2 Meeting #97bis; Spokane, Washington, USA, Apr. 3-7, 2017; Agenda item: 9.1.2.2; Source: Huawei, HiSilicon; Title: System information acquisition for eRemote UE; Document for: Discussion and Decision.

R2-1711449; 3GPP TSG-RAN WG2 #99bis; Prague, Czech Republic, Oct. 9-13, 2017; Agenda item: 9.1; Source: Nokia, Nokia Shanghai Bell; Title: Discussion on SA2 assumptions; WID/SID: NR_newRAT-Core—Release 15; Document for: Discussion and Decision.

S2-1910927; 3GPP TSG-SA2 Meeting #136; Reno, Nevada, United States, Nov. 18, 2019-Nov. 22, 2019; rev of S2-19AAAAA; Source: vivo Mobile Communications Ltd; Title: Path switching clarification; Document for: Agreement; Agenda Item: 8.6; Work Item / Release: FS_5G_ProSe / Rel-17.

S2-1911412; SA WG2 Meeting #136; Nov. 18-22, 2019, Reno, Nevada, USA; (revision of S2-19xxxxx); Source: Intel; Title: Prose Architecture Assumptions Update; Document for: Agreement; Agenda Item: 8.6; Work Item / Release: FS_5G_ProSe / Rel-17.

S2-1911416; SA WG2 Meeting #136; Nov. 18-22, 2019, Reno, Nevada, USA; (revision of S2-19xxxxx); Source: Intel; Title: UE-to-Network Relay KI update; Document for: Agreement; Agenda Item: 8.6; Work Item / Release: FS_5G_ProSe / Rel-17.

S2-1911417; SA WG2 Meeting #136; Nov. 18-22, 2019, Reno, Nevada, USA; (revision of S2-19xxxxx); Source: Intel; Title: Solution for Key Issue #6; Document for: Agreement; Agenda Item: 8.6; Work Item / Release: FS_5G_ProSe / Rel-17.

S2-1911444; SA WG2 Meeting #136; Nov. 18-22, 2019, Reno, USA; (revision of S2-190xxxx); Source: CATT; Title: Solution for path switch between PC5 and Uu; Document for: Approval; Agenda Item: 8.6; Work Item / Release: FS_5G_ProSe / Rel-17.

S2-1911450; SA WG2 Meeting #136; Nov. 18-22, 2019, Reno, USA; (revision of S2-190xxxx); Source: CATT; Title: Solution for path selection between PC5 path and Uu path; Document for: Approval; Agenda Item: 8.6; Work Item / Release: FS_5G_ProSe / Rel-17.

S2-1911451; SA WG2 Meeting #136; Nov. 18-22, 2019, Reno, USA; (revision of S2-190xxxx); Source: CATT; Title: Solution to support UE-to-UE Relay; Document for: Approval; Agenda Item: 8.6; Work Item / Release: FS_5G_ProSe / Rel-17.

S2-1911489; SA WG2 Meeting #136; Nov. 18-22, 2019, Reno, Nevada, USA; (revision of S2-191xxxx); Source: CATT; Title: Solution for ProSe QoS; Document for: Approval; Agenda Item: 8.6; Work Item / Release: FS_5G_ProSe / Rel-17.

S2-1911537; SA WG2 Meeting #136; Nov. 18-22, 2019, Reno, USA, Source: Mediatek Inc.; Title: Solution for key issue#3: Support for UE-to-Network Relay; Document for: Approval; Agenda Item: 8.6; Work Item / Release: FS_5G_ProSe / Rel-17.

S2-1911554; SA WG2 Meeting #136; Reno, NV, USA, Nov. 18-22, 2019; (revision of S2-191xxxx); Source: Huawei, HiSilicon; Title: Solution for Key Issue #3: Service continuity via UE-to-Network Relay; Document for: Approval; Agenda Item: 8.6; Work Item / Release: 5G ProSe / Rel-17.

S2-1911665; SA WG2 Meeting #136; Reno, NV, USA, Nov. 18-22, 2019; (revision of S2-191xxxx); Source: Huawei, HiSilicon, Lenovo, Motorola Mobility; Title: Solution for Key Issue #3: Indirect Communication via UE-to-Network Relay; Document for: Approval; Agenda Item: 8.6; Work Item / Release: 5G ProSe / Rel-17.

S2-1911667; SA WG2 Meeting #136; Reno, NV, USA, Nov. 18-22, 2019; (revision of S2-191xxxx); Source: Huawei, HiSilicon; Title: Solution for the KI: Support direct communication path selection and switching between PC5 and Uu; Document for: Approval; Agenda Item: 8.6; Work Item / Release: FS_5G_ProSe / [Rel-17].

S2-1911798; SA WG2 Meeting #136; Nov. 18-22, 2019, Reno, US; (revision of S2-18xxxx); Source: InterDigital Inc.; Title: Solution for KI #3: Support of UE-to-Network Relay; Document for: Approval; Agenda Item: 8.6; Work Item / Release: FS_5G_ProSe / Rel-17.

S2-1911922; SA WG2 Meeting #136; Reno, NV, USA, Nov. 18-22, 2019; (was S2-19xxxx); Source: Qualcomm Incorporated; Title: UE-to-NW Relay discovery; Document for: Discussion/Approval; Agenda Item: 8.6; Work Item / Release: 5G_ProSe/Rel.17.

S2-1912400; SA WG2 Meeting #136; Nov. 18-22, 2019, Reno, USA; (merge of S2-1911444 and part of 11667); Source: CATT, Huawei, HiSilicon; Title: Solution for path switch between PC5 and Uu; Document for: Approval; Agenda Item: 8.6; Work Item / Release: FS_5G_ProSe / Rel-17.

S2-1912463; SA WG2 Meeting #136; Nov. 18-22, 2019, Reno, USA; (revision of S2-1911390); Source: LG Electronics; Title: Solution for PC5 group communication (KI#1 & KI#2 related); Document for: Approval; Agenda Item: 8.6; Work Item / Release: FS_5G_ProSe / Rel-17.

S2-1912700; 3GPP SA WG2 Meeting #136; Nov. 18-22, 2019, Reno, US; Source: Samsung; Title: Update terminology and Architecture Requirement; Document for: Approval; Agenda Item: 8.6; Work Item / Release: FS_5G_ProSe / Rel-17.

S2-1912706; SA WG2 Meeting #136; Nov. 18-22, 2019, Reno, USA; (revision of S2-1912349); Source: vivo; Title: Clarification on the path selection; Document for: Discussion/Approval; Agenda Item: 8.6; Work Item / Release: FS_5G_ProSe/Rel-17.

S2-1912707; SA WG2 Meeting #136; Nov. 18-22, 2019, Reno, USA; (Merge of S2-1911151 and S2-1911800); Source: OPPO, Interdigital; Title: Solution for direct discovery; Document for: Approval; Agenda Item: 8.6; Work Item / Release: 5G_ProSe / Rel-17.

S2-1912708; 3GPP TSG-SA2 Meeting #136; Reno, Nevada, United States, Nov. 18, 2019-Nov. 22, 2019; rev of S2-1910916, rev 12460; Source: vivo Mobile Communications Ltd; Title: Solution for direct discovery; Document for: Agreement; Agenda Item: 8.6; Work Item / Release: FS_5G_ProSe / Rel-17.

S2-1912710; SA WG2 Meeting #136; Nov. 18-22, 2019, Reno, Nevada, USA; (revision of S2-1912464); Source: CATT; Title: Solution for ProSe communication; Document for: Approval; Agenda Item: 8.6; Work Item / Release: FS_5G_ProSe / Rel-17.

S2-1912711; SA WG2 Meeting #136; Reno, NV, USA, Nov. 18-22, 2019; (was S2-192465 was S2-1911808+S2-1911490+ part of S2-1911798); Source: Qualcomm Incorporated, CATT, InterDigital Inc., Samsung, Ericsson; Title: L3 UE-NW Relays; Document for: Discussion/Approval; Agenda Item: 8.6; Work Item / Release: FS_5G_ProSe/Rel.17.

S2-1912709; SA WG2 Meeting #136; Reno, NV, USA, Nov. 18-22, 2019; (was S2-1912462 was S2-1911809); Source: Qualcomm Incorporated, LG Electronics, Intel; Title: Solution for ProSe 5G Direct Discovery using PC5-U; Document for: Discussion/Approval; Agenda Item: 8.6; Work Item / Release: 5G_ProSe/Rel.17.

S2-1912746; SA WG2 Meeting #136; Reno, NV, USA, Nov. 18-22, 2019; (revision of S2-1911212, merge of S2-1911537); Source: Huawei, HiSilicon, Lenovo, Motorola Mobility, Mediatek, TNO, KPN, Philips, Intel, Vivo; Title: Solution for Key Issue #3: Indirect Communication via UE-to-Network Relay UE; Document for: Approval; Agenda Item: 8.6; Work Item / Release: 5G ProSe / Rel-17.

S2-2000787; SA WG2 Meeting #136AH; Incheon, Korea, Jan. 13-17, 2020; (revision of S2-20nnnnn); Source: MediaTek Inc.; Title: FS_5G_ProSe: L2-Relay: Mobility Restrictions; Document for: Approval; Agenda Item: 8.6; Work Item / Release: FS_5G_ProSe / Rel-17.

3GPP TS 23.287 V16.0.0 (Sep. 2019); Technical Specification; 3rd Generation Partnership Project; Technical Specification Group Services and System Aspects; Architecture enhancements for 5G System (5GS) to support Vehicle-to-Everything (V2X) services; (Release 16).

3GPP TS 23.303 V15.1.0 (Jun. 2018); Technical Specification; 3rd Generation Partnership Project; Technical Specification Group Services and System Aspects; Proximity-based services (ProSe); Stage 2; (Release 15).

3GPP TS 23.501 V16.2.0 (Sep. 2019); Technical Specification; 3rd Generation Partnership Project; Technical Specification Group Services and System Aspects; System Architecture for the 5G System (5GS); Stage 2; (Release 16).

(56) References Cited

OTHER PUBLICATIONS

3GPP TS 23.502 V16.2.0 (Sep. 2019); Technical Specification; 3rd Generation Partnership Project; Technical Specification Group Services and System Aspects; Procedures for the 5G System (5GS); Stage 2; (Release 16).
3GPP TS 23.503 V16.2.0 (Sep. 2019); Technical Specification; 3rd Generation Partnership Project; Technical Specification Group Services and System Aspects; Policy and Charging Control Framework for the 5G System (5GS); Stage 2; (Release 16).
3GPP TR 23.703 V12.0.0 (Feb. 2014); Technical Report; 3rd Generation Partnership Project; Technical Specification Group Services and System Aspects; Study on architecture enhancements to support; Proximity-based Services (ProSe); (Release 12).
3GPP TR 23.733 V2.0.0 (Sep. 2017); Technical Report; 3rd Generation Partnership Project; Technical Specification Group Services and System Aspects; Study on Architecture Enhancements to ProSe UE-to-Network Relay; (Release 15).
3GPP TR 23.733 V15.1.0 (Dec. 2017); Technical Report; 3rd Generation Partnership Project; Technical Specification Group Services and System Aspects; Study on Architecture Enhancements to ProSe UE-to-Network Relay; (Release 15).
3GPP TR 23.752 V0.1.0 (Oct. 2019); Technical Report; 3rd Generation Partnership Project; Technical Specification Group Services and System Aspects; Study on system enhancement for Proximity based Services (ProSe) in the 5G System (5GS); (Release 17).
3GPP TR 23.752 V0.2.0 (Dec. 2019); Technical Report; 3rd Generation Partnership Project; Technical Specification Group Services and System Aspects; Study on system enhancement for Proximity based Services (ProSe) in the 5G System (5GS); (Release 17).
3GPP TS 24.526 V16.1.0 (Sep. 2019); Technical Specification; 3rd Generation Partnership Project; Technical Specification Group Core Network and Terminals; User Equipment (UE) policies for 5G System (5GS); Stage 3; (Release 16).
3GPP TS 24.587 V1.0.0 (Dec. 2019); Technical Specification; 3rd Generation Partnership Project; Technical Specification Group Core Network and Terminals; Vehicle-to-Everything (V2X) services in 5G System (5GS); Protocol aspects; Stage 3; (Release 16).
3GPP TS 24.588 V1.0.0 (Dec. 2019); Technical Specification; 3rd Generation Partnership Project; Technical Specification Group Core Network and Terminals; Vehicle-to-Everything (V2X) services in 5G System (5GS); User Equipment (UE) policies; Stage 3; (Release 16).
3GPP TS 29.345 V15.1.0 (Sep. 2019); Technical Specification; 3rd Generation Partnership Project; Technical Specification Group Core Network and Terminals; Inter-Proximity-services (ProSe) Function signalling aspects; Stage 3; (Release 15).
3GPP TR 36.746 V15.1.1 (Apr. 2018); Technical Report; 3rd Generation Partnership Project; Technical Specification Group Radio Access Network; Study on further enhancements to LTE Device to Device (D2D), User Equipment (UE) to network relays for Internet of Things (IoT) and wearables; (Release 15).
CP-193156; 3GPP TSG-CT Meeting 86; Sitges, Spain, Dec. 9-10, 2019; Title: Presentation of Specification to TSG CT: TS 24.587, Version 1.0.0; Source: CT1; Document for: Information.
CP-19xxxx; 3GPP TSG-CT Meeting #86; Sitges, Spain; Dec. 9-10, 2019; Title: Presentation of Specification/Report to TSG: TS 24.588, Version 1.0.0; Source: CT WG1; Document for: Information.
International Search Report and Written Opinion of the International Searching Authority mailed Apr. 29, 2021, in International Application No. PCT/US2021/013827.
S2-2001498; SA WG2 Meeting #136AH; Jan. 13-17, 2020, Incheon, Korea; Source: OPPO, CATT; Title: Solution for UE-to-Network Relay discovery and selection; Document for: Approval; Agenda Item: 8.6; Work Item / Release: FS_5G_ProSe / Rel-17.
C1-154703; (was C1-154688); 3GPP TSG-CT WG1 Meeting #95; Anaheim (CA), USA, Nov. 16-20, 2015; CR-Form-v11.1; Change Request; 24.334 CR 0199; rev 3; Current version: 13.1.0; Title: UE-to-network relay selection and reselection procedure.
R2-1900761; 3GPP TSG RAN WG2 Meeting #105; Athens, Greece, Feb. 1-Mar. 25, 2019; Agenda Item: 11.13; Source: Intel Corporation; Title: RAN2 impact on Non-Public Network Deployment using CAG; Document for: Discussion/Decision.

* cited by examiner

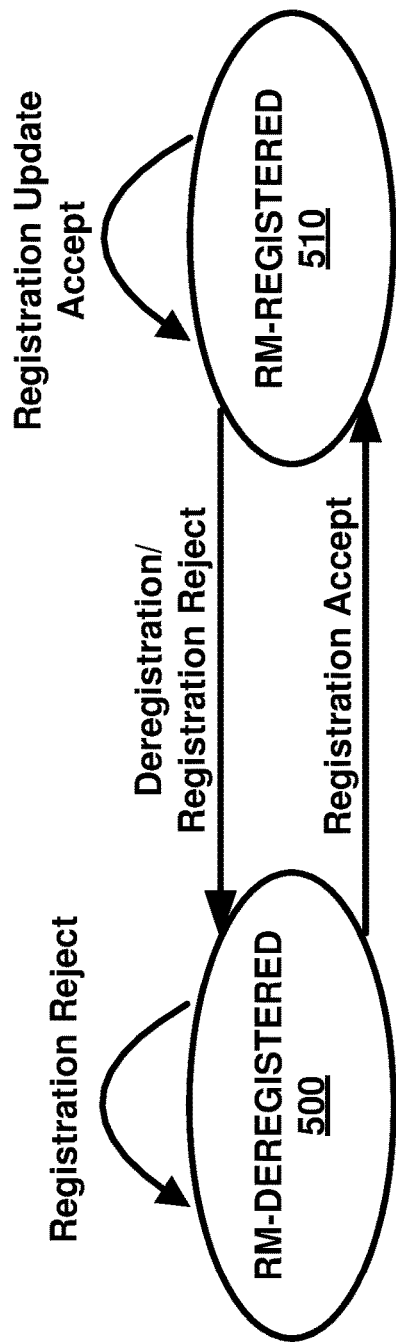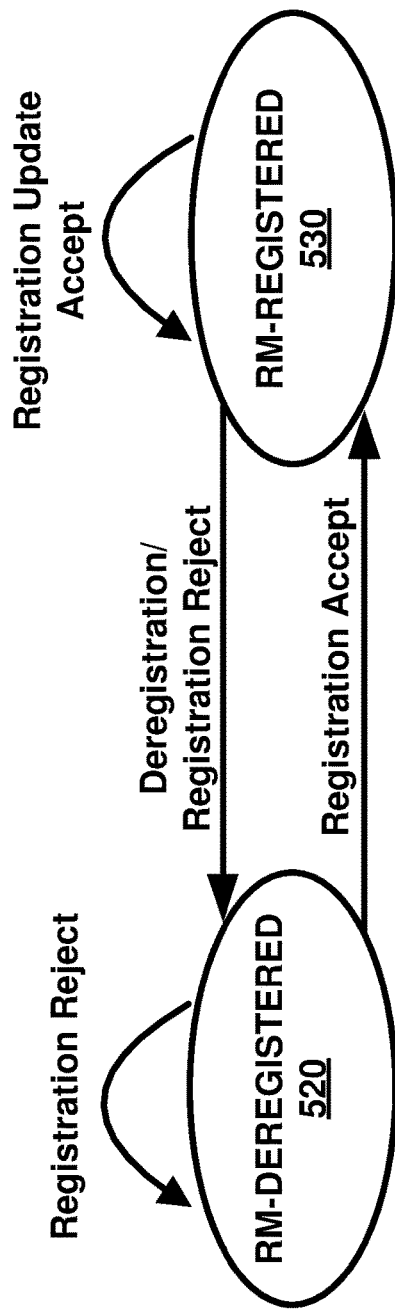

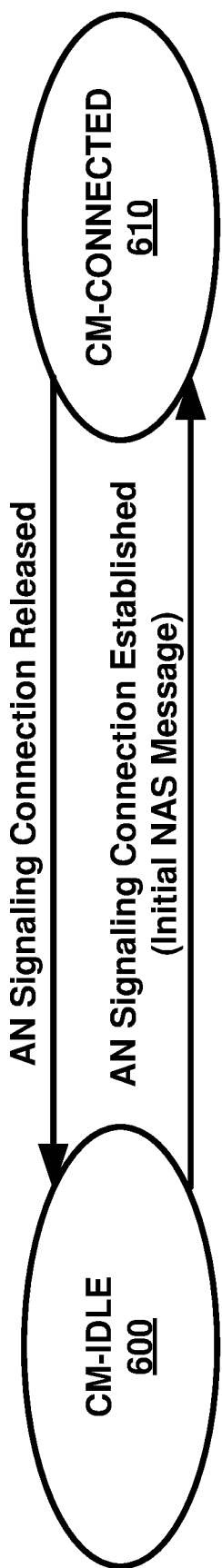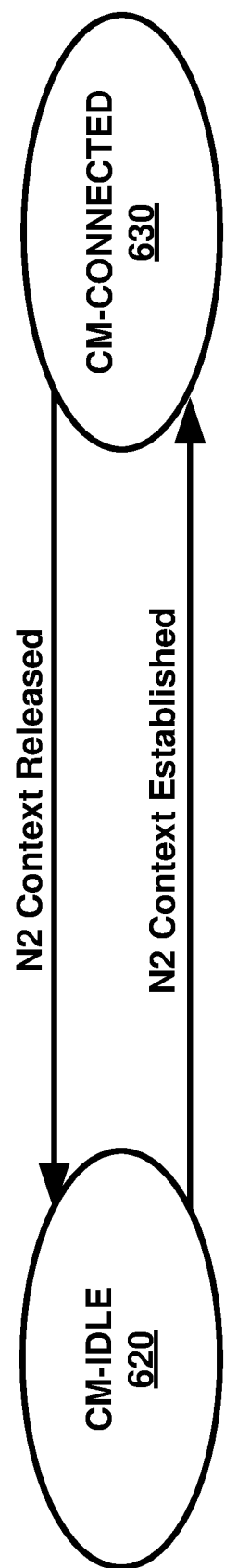

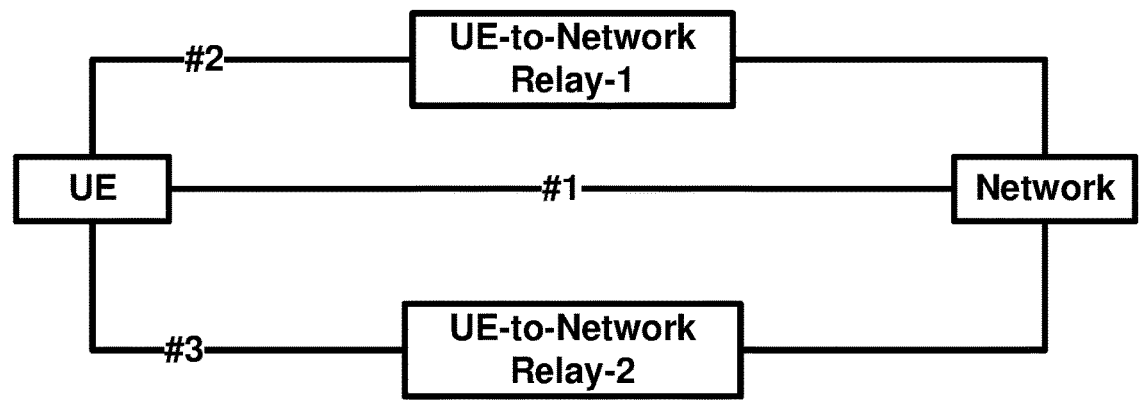
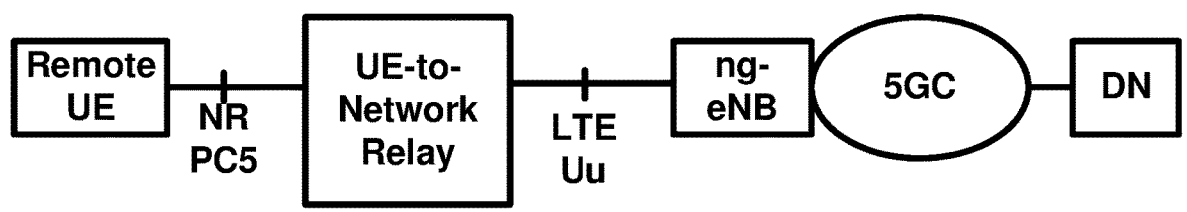
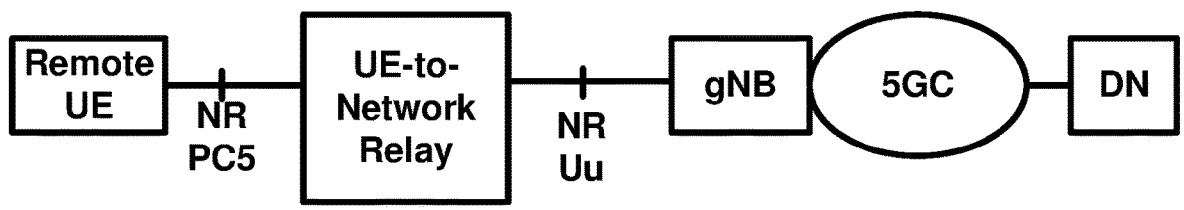
FIG. 14

UE Policy delivery procedure sending, by a relay UE to a UE, a discovery announce
message comprising a first access status of the relay UE
comprising at least one of:
a closed access group (CAG) information of the relay UE;
a tracking area identity; and
a radio access type (RAT)

3010

receiving, by the relay UE from the UE, a connection request
message based on matching an element of the first access
status of the relay UE and a mobility restriction of the UE, to
establish a connection with a network via the relay UE.
3020

FIG. 30

Sending, by a UE to a relay UE, a solicitation message to establish a connection with a network via the relay UE, the solicitation message comprising a second mobility restriction information of the UE comprising at least one of:
one or more closed access group (CAG) identifiers of the UE;
radio access type (RAT) restriction;
forbidden area;
service area restrictions; and
core network type restriction

3110

receiving, by the UE from the relay UE, a response message based on matching the second mobility restriction of the UE and a first mobility restriction of the relay UE

RELAY NODE SELECTION

CROSS-REFERENCE TO RELATED APPLICATIONS

This application is a continuation of International Patent Application No. PCT/US2021/013827, filed Jan. 18, 2021, which claims the benefit of U.S. Provisional Application No. 62/963,130, filed Jan. 19, 2020, all of which are hereby incorporated by reference in their entireties.

BRIEF DESCRIPTION OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 14 is an example diagram as per an aspect of an embodiment of the disclosure.

FIG. 30 is an example diagram as per an aspect of an embodiment of the disclosure.

FIG. 31 is an example diagram as per an aspect of an embodiment of the disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
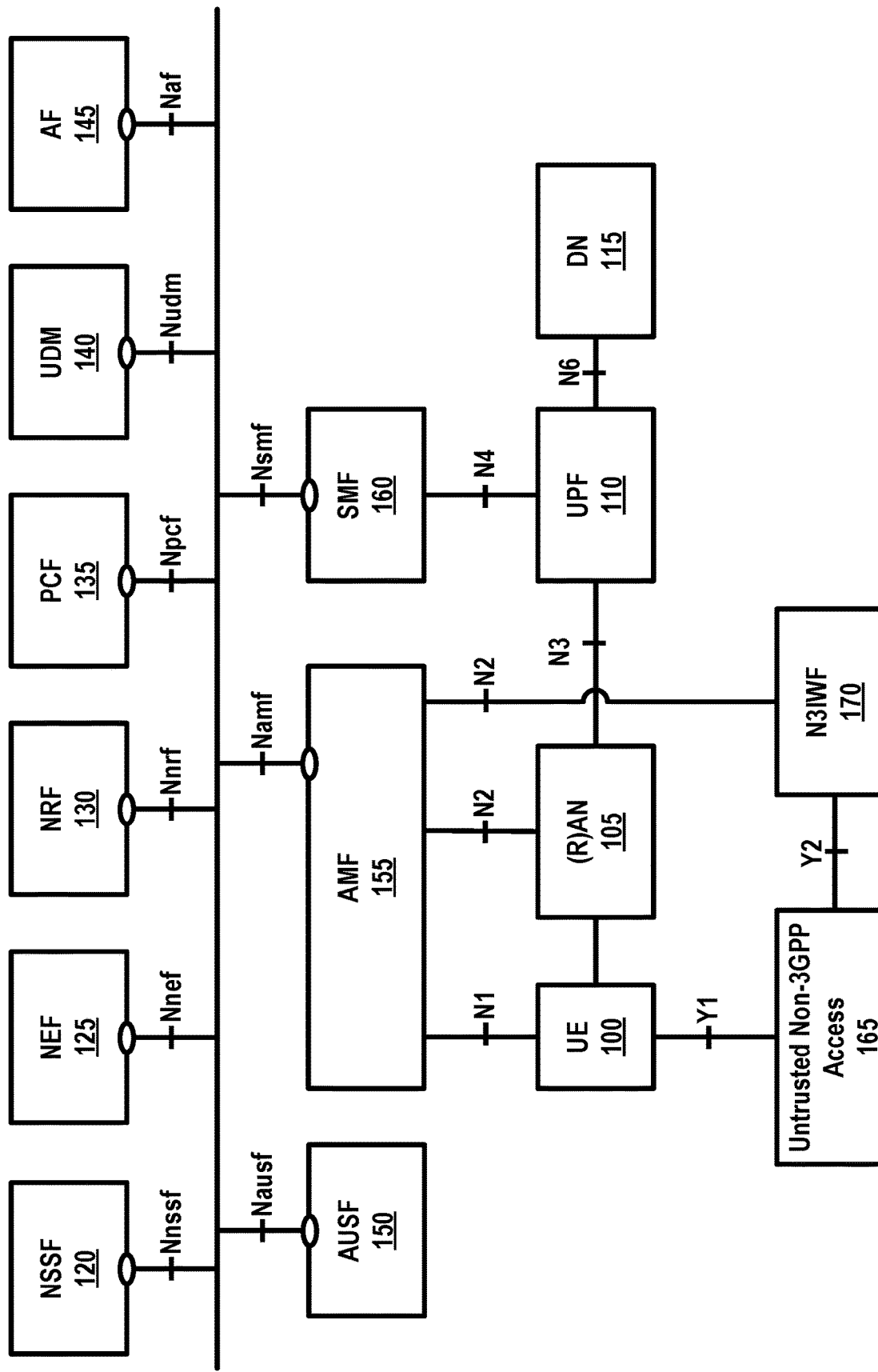
FIG. 1 is a diagram of an example 5G system architecture as per an aspect of an embodiment of the present disclosure.
Figure 2:
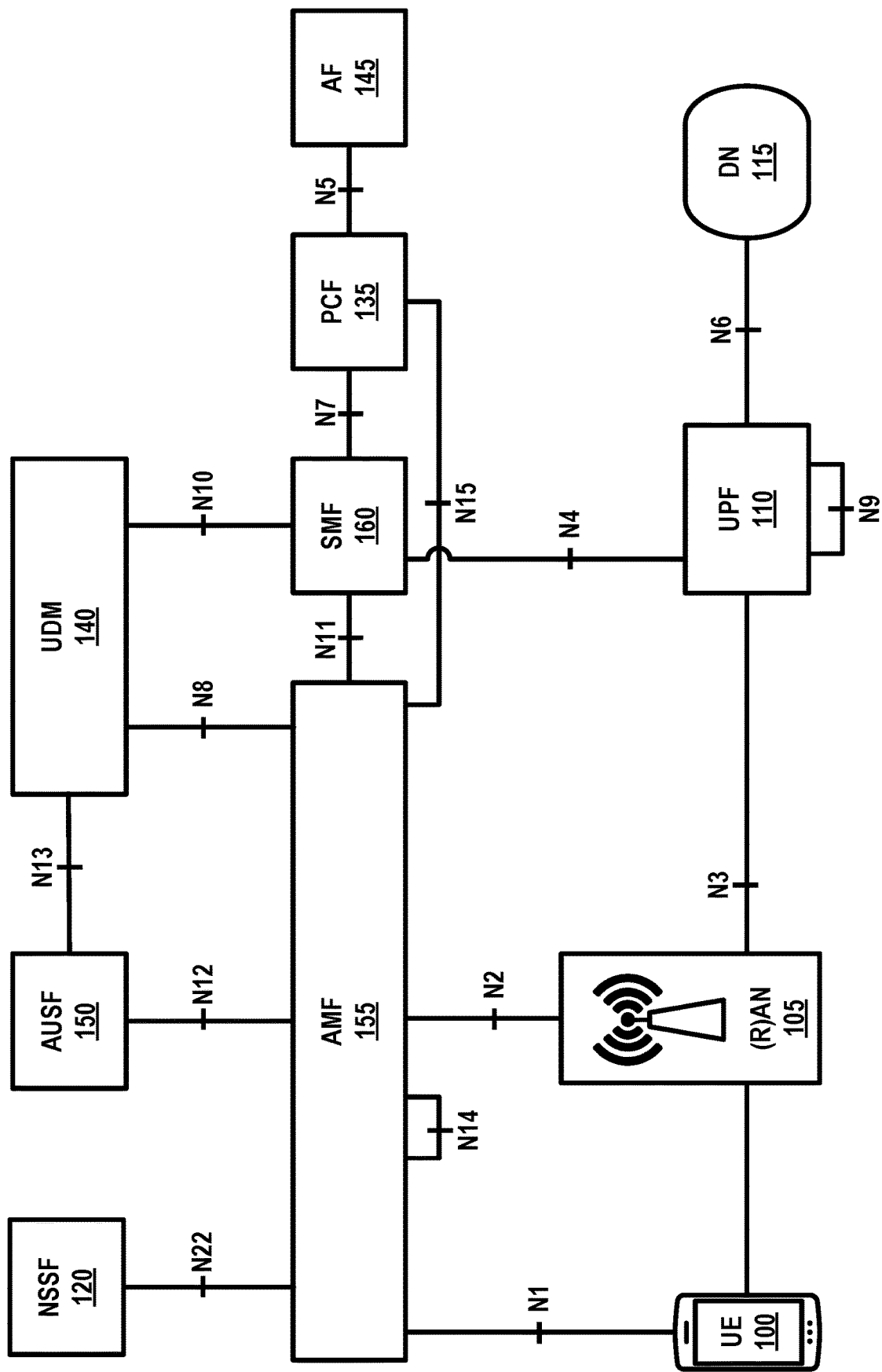
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
F-TEID Fully Qualified TEID
GPSI Generic Public Subscription Identifier
GTP GPRS Tunneling Protocol
GUTI Globally Unique Temporary Identifier
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SMF Session Management Function
SMSF SMS Function
S-NSSAI Single Network Slice Selection Assistance information
SUCI Served User Correlation ID
SUPI Subscriber Permanent Identifier
TEID Tunnel Endpoint Identifier
TSN Time Sensitive Networking
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
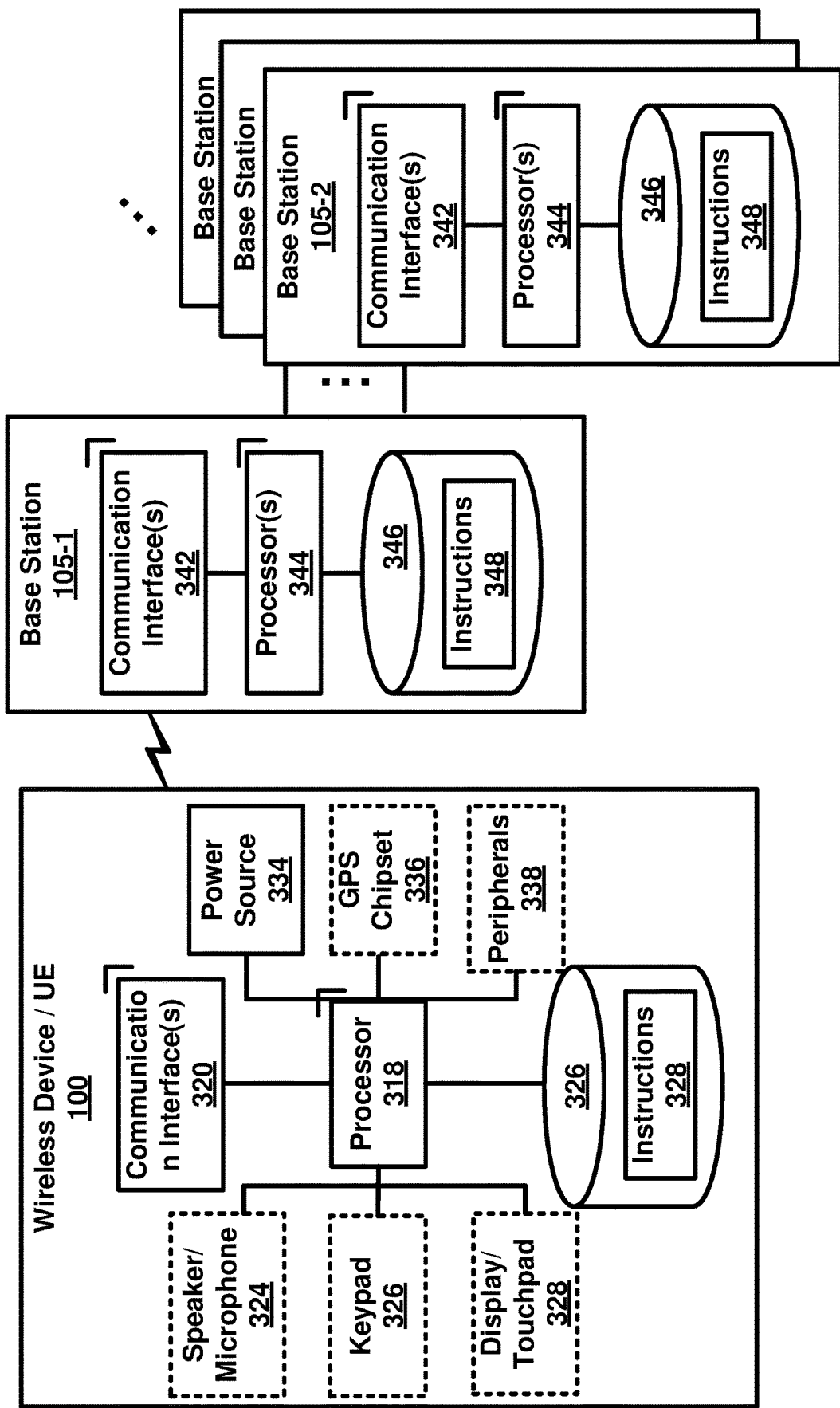
FIG. 3 is a system diagram of an example wireless device and a network node in a 5G system as per an aspect of an embodiment of the present disclosure.
Figure 4:
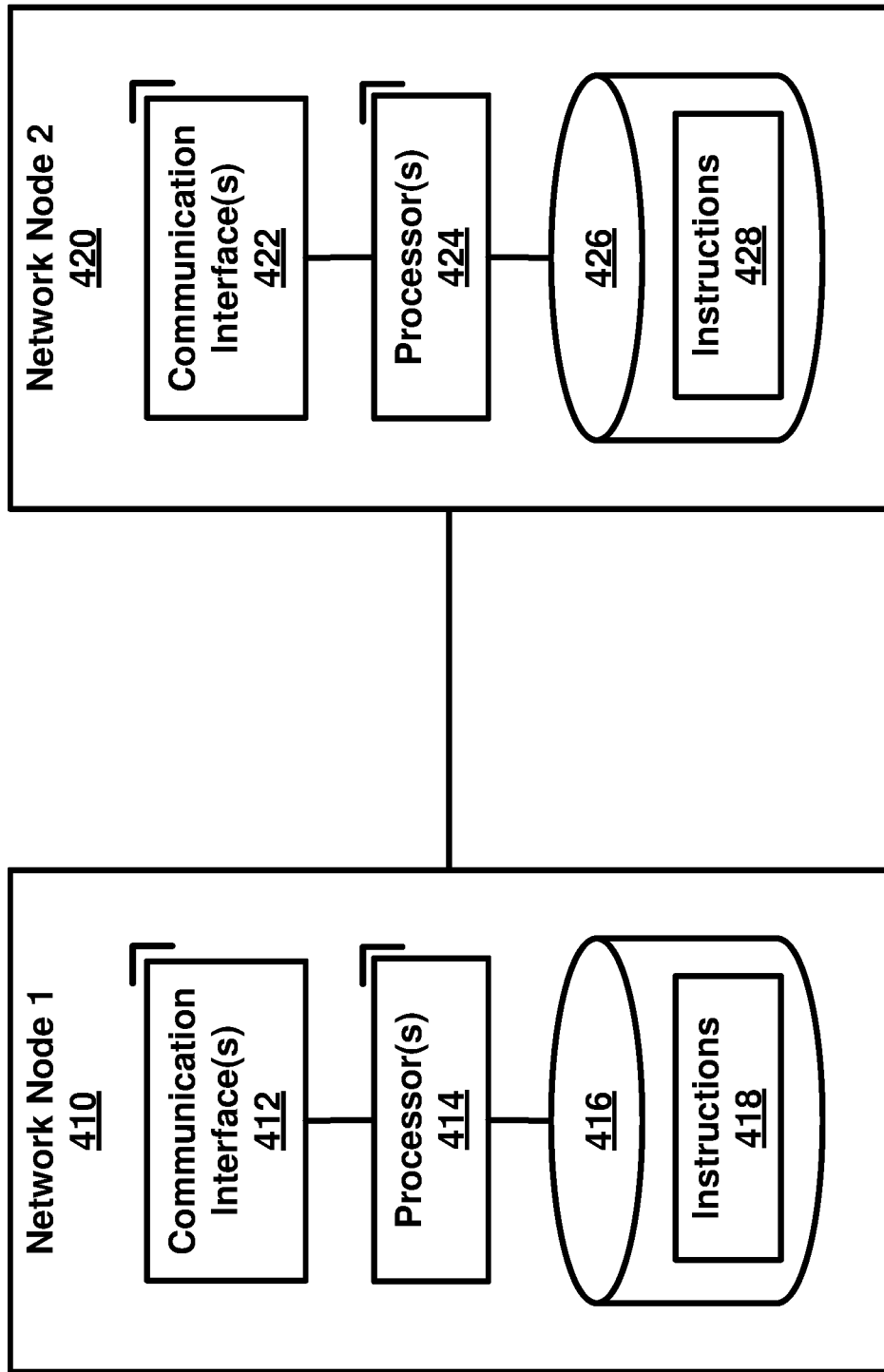
FIG. 4 is a system diagram of an example network node as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
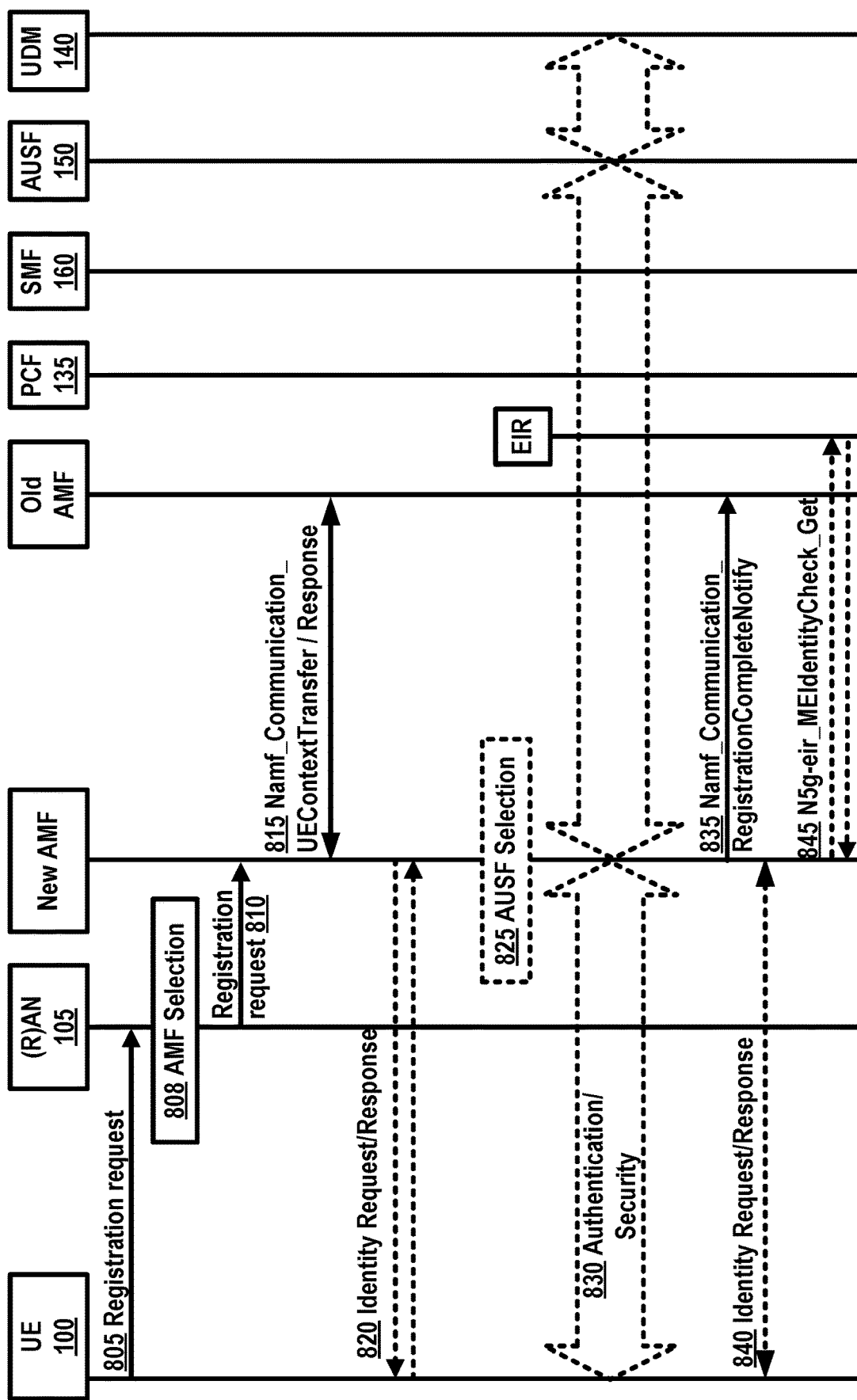
FIG. 8 is an example call flow as per an aspect of an embodiment of the disclosure.
Figure 9:
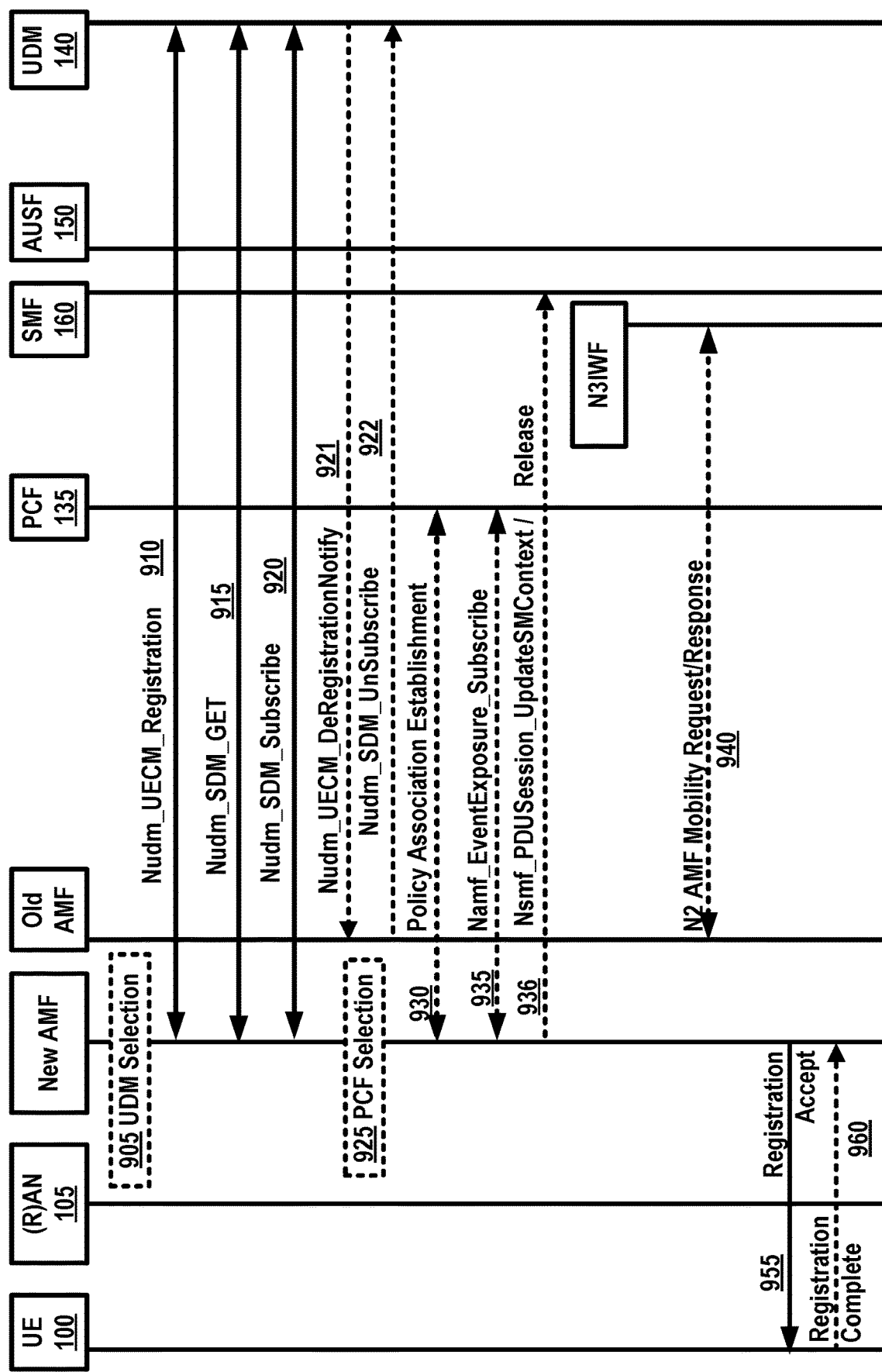
FIG. 9 is an example call flow as per an aspect of an embodiment of the disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
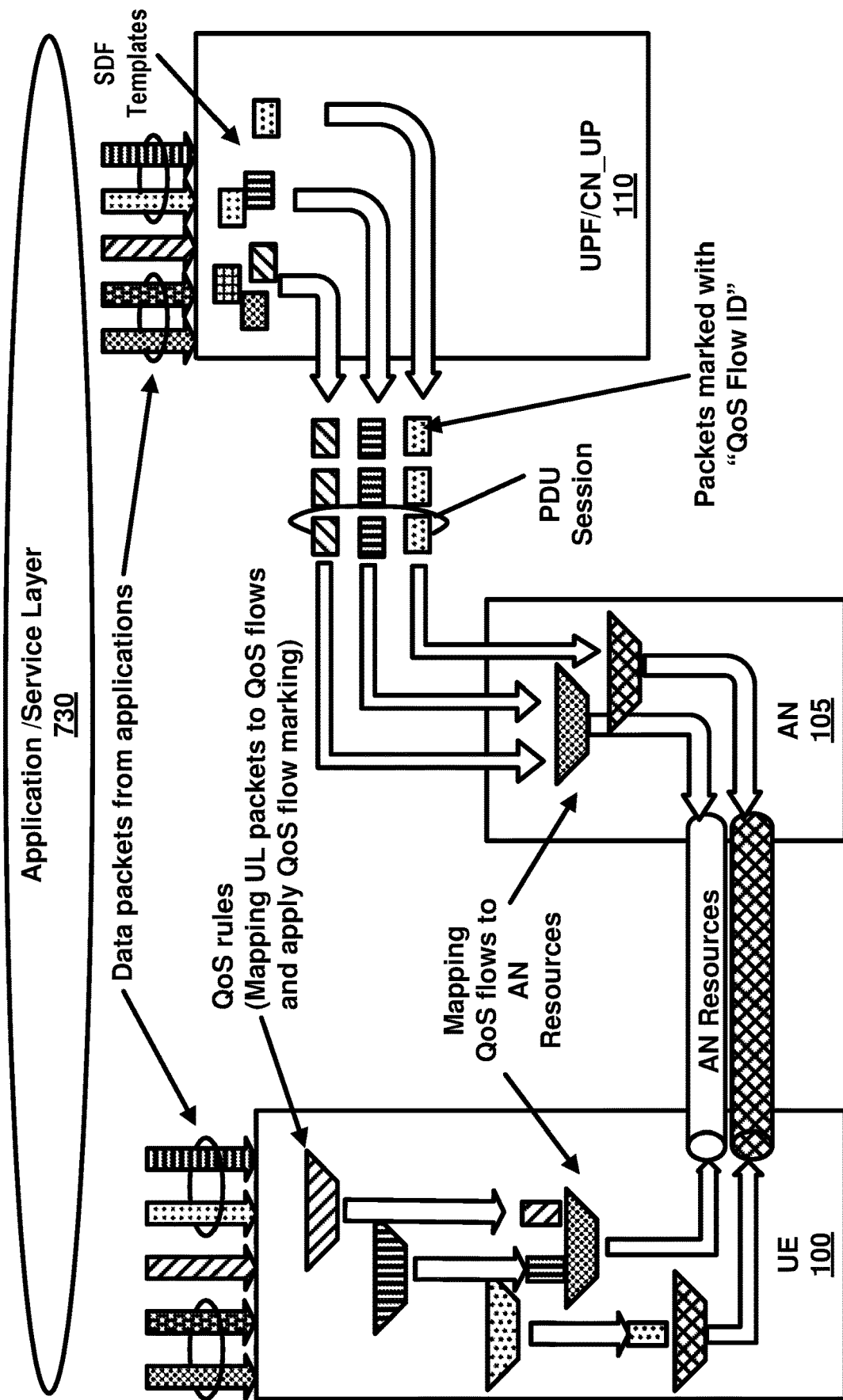
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 may be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by one or more PLMN(s) based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of one or more S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by one or more NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContext-Transfer (SUPI, MM context, SMF 160 information, PCF ID). In an example, the old AMF 155 may respond to the new AMF 155 for the Namf_Communication_UEContext-Transfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may selects a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160*s* of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of one or more S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
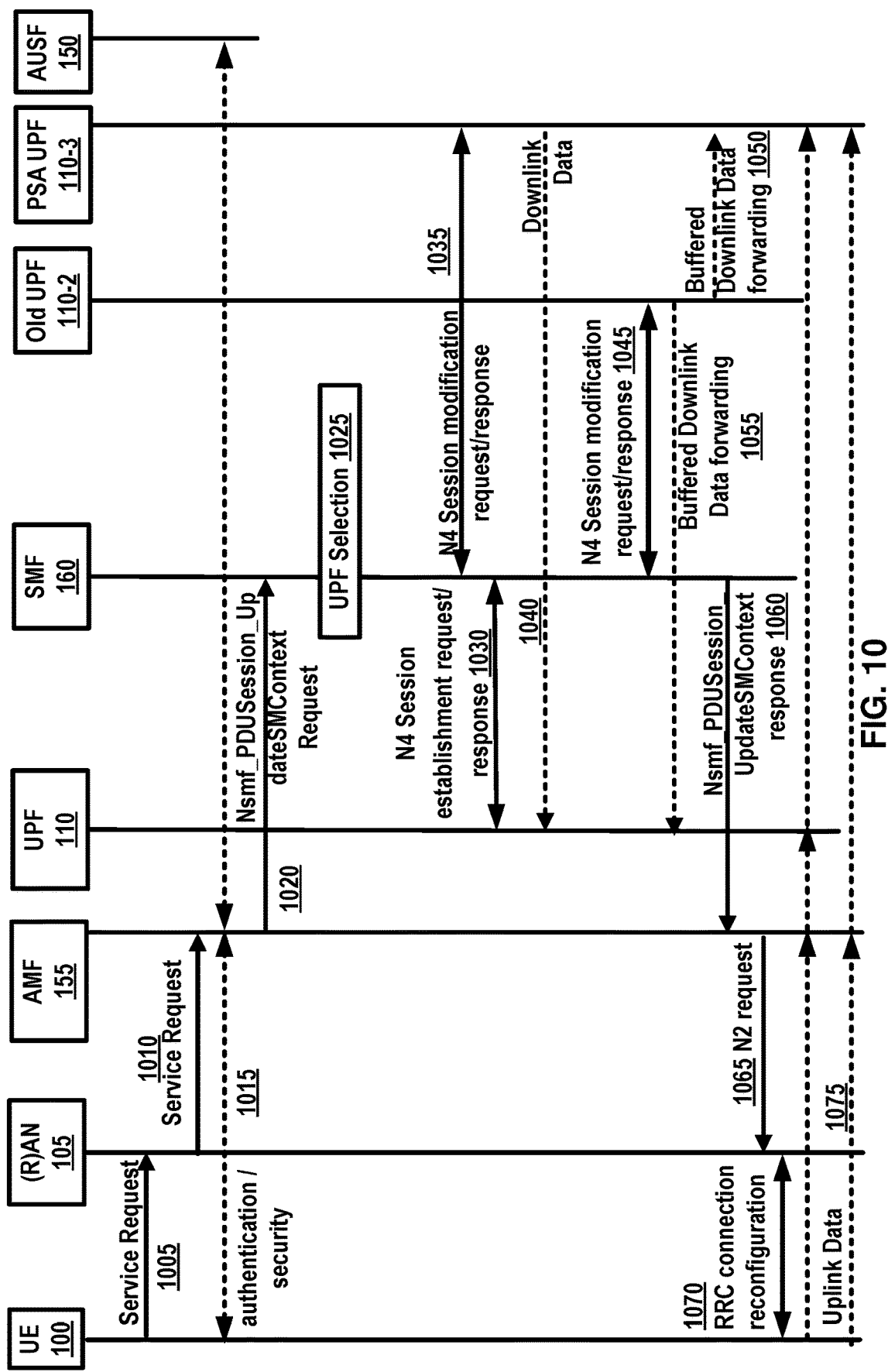
FIG. 10 is an example call flow as per an aspect of an embodiment of the disclosure.
Figure 11:
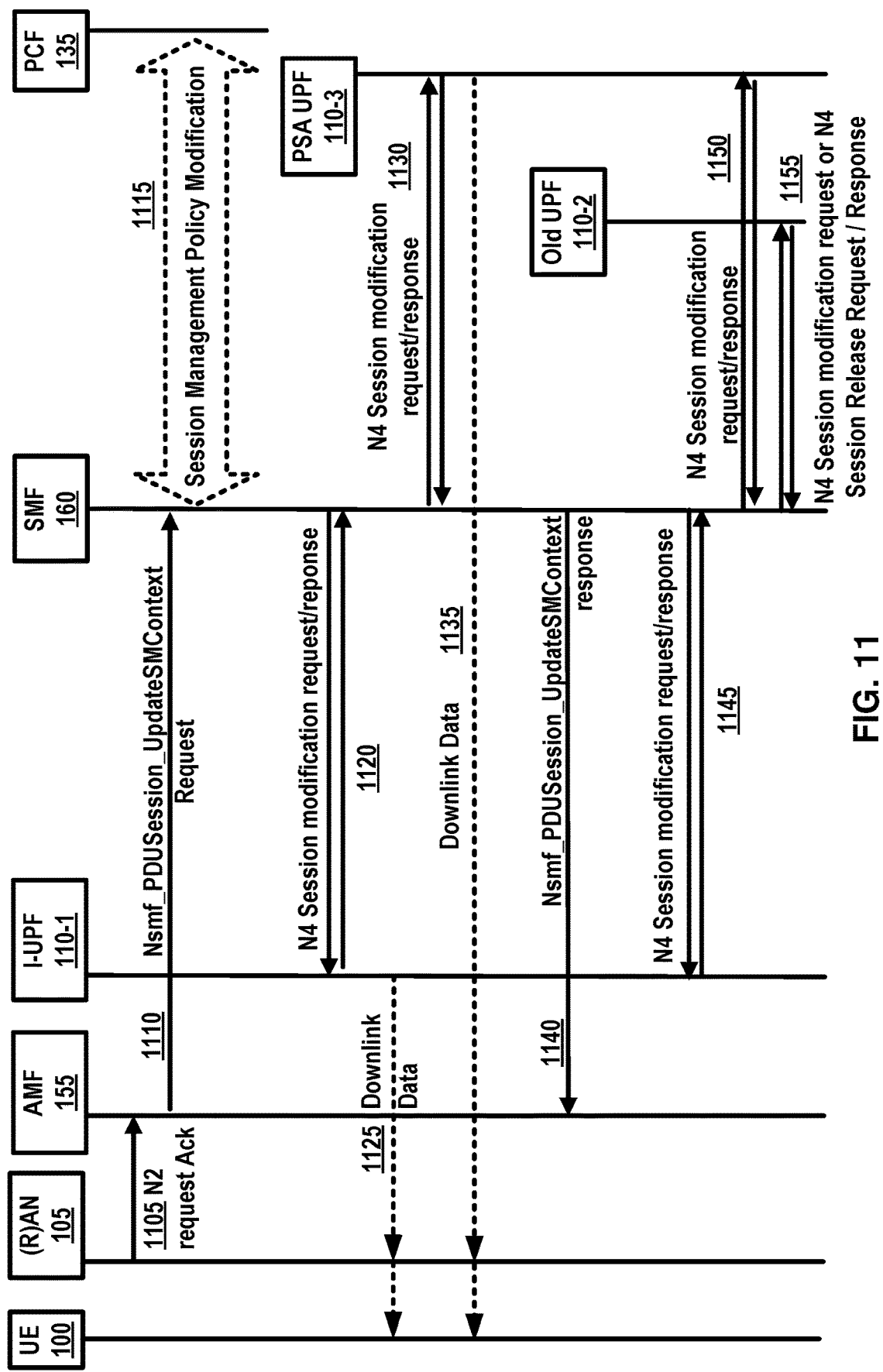
FIG. 11 is an example call flow as per an aspect of an embodiment of the disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_P-DUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including, e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160*s* may be involved, the AMF 155 may send one N2 request message to (R)AN 105 after all the Nsmf_PDUSession_UpdateSM-Context response service operations from all the SMF 160*s* associated with the UE 100 may be received. In such case, the N2 request message may include the N2 SM information received in one or more of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
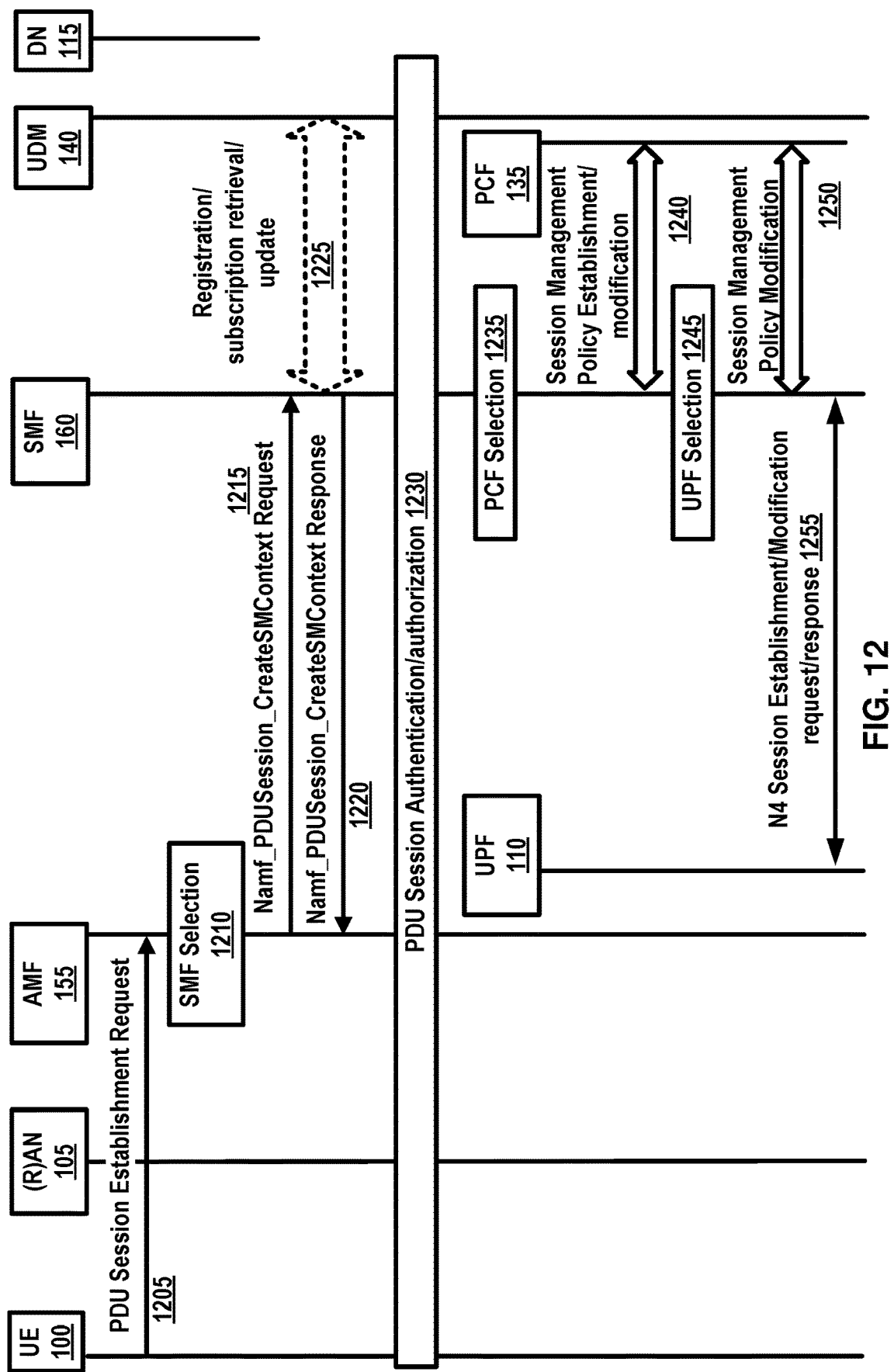
FIG. 12 is an example call flow as per an aspect of an embodiment of the disclosure.
Figure 13:
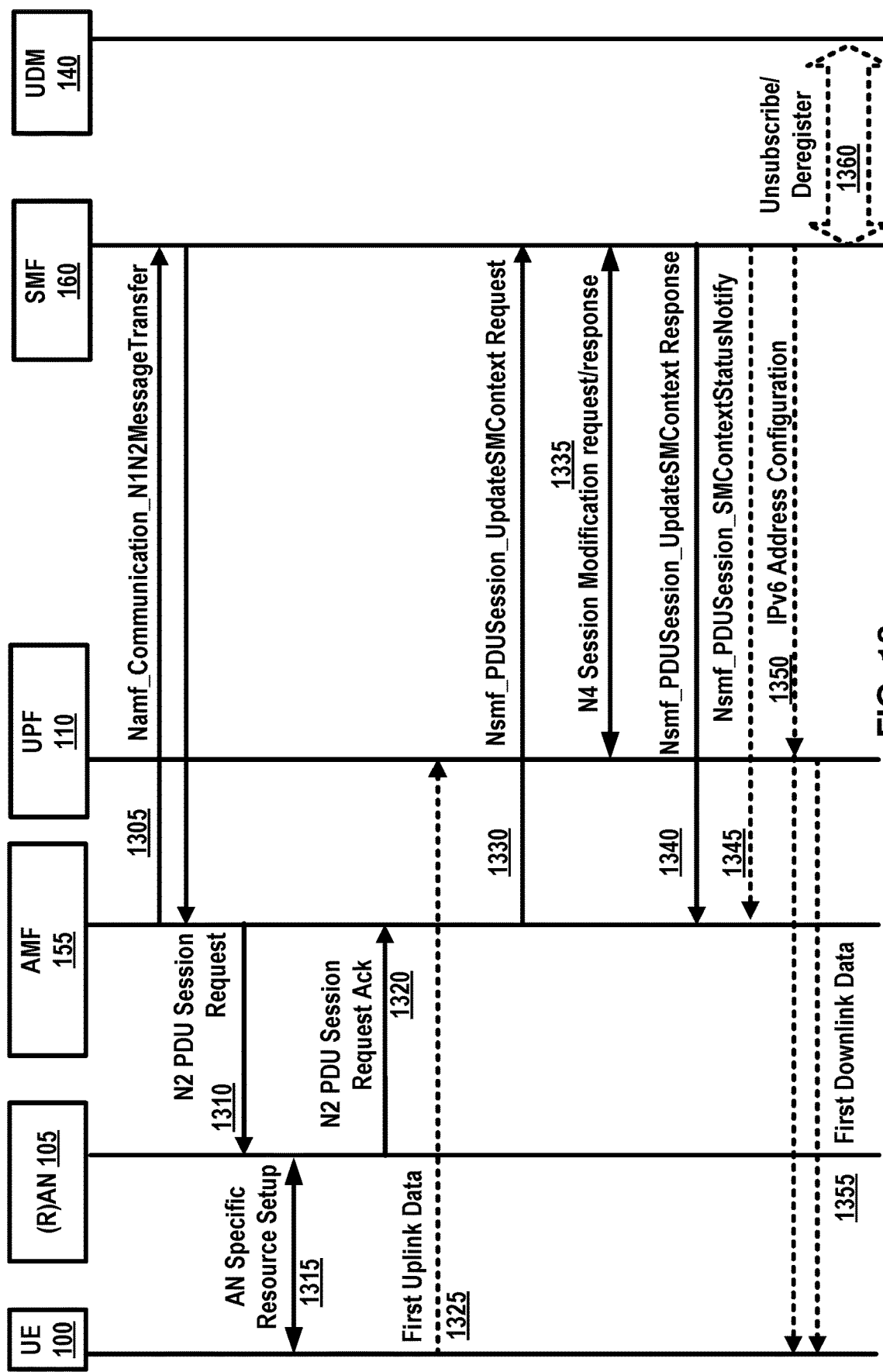
FIG. 13 is an example call flow as per an aspect of an embodiment of the disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g., when request type indicates initial request), the AMF 155 may invoke the Nsmf_PDUSession_CreateSMContext request, but if the AMF 155 already has an association with an SMF 160 for the PDU session ID provided by the UE 100 (e.g., when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPT. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with one or more UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for one or more involved RAN 105 nodes, and the QFIs assigned to one or more tunnel endpoints. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

The case that UE may be able to access to network via the direct or indirect Uu path is illustrated in example FIG. 14. As depicted in FIG. 14, path #1 is direct Uu path that may not be available e.g., due to the UE being out of coverage. Path #2 and path #3 are indirect Uu paths via different UE-to-Network Relays. 3GPP communication systems may support UE-to-Network Relay. In an example, the 3GPP system may support procedures to establish a connection between a first wireless device and a second wireless device (e.g., Remote UE and a UE-to-Network Relay) to support connectivity to the network for the Remote UE. 3GPP communication systems may support end-to-end requirements between a remote UE and the network via a UE-to-Network relay, including QoS (such as data rate, reliability, latency, and/or the like) and the handling of PDU session related attributes (e.g., S-NSSAI, DNN, PDU Session Type and SSC mode).

3GPP systems (e.g., 5G, 6G, and/or the like) may support communication path selection between a direct Uu path (i.e. path #1 in FIG. 14) and an indirect Uu path (i.e. path #2 or path #3 in FIG. 14) via a UE-to-Network Relay. Two cases may be considered regarding support of UE-to-Network Relay as shown in FIG. 14, i.e., UE-to-Network Relay served by gNB and UE-to-Network Relay served by ng-eNB.

Figure 15:
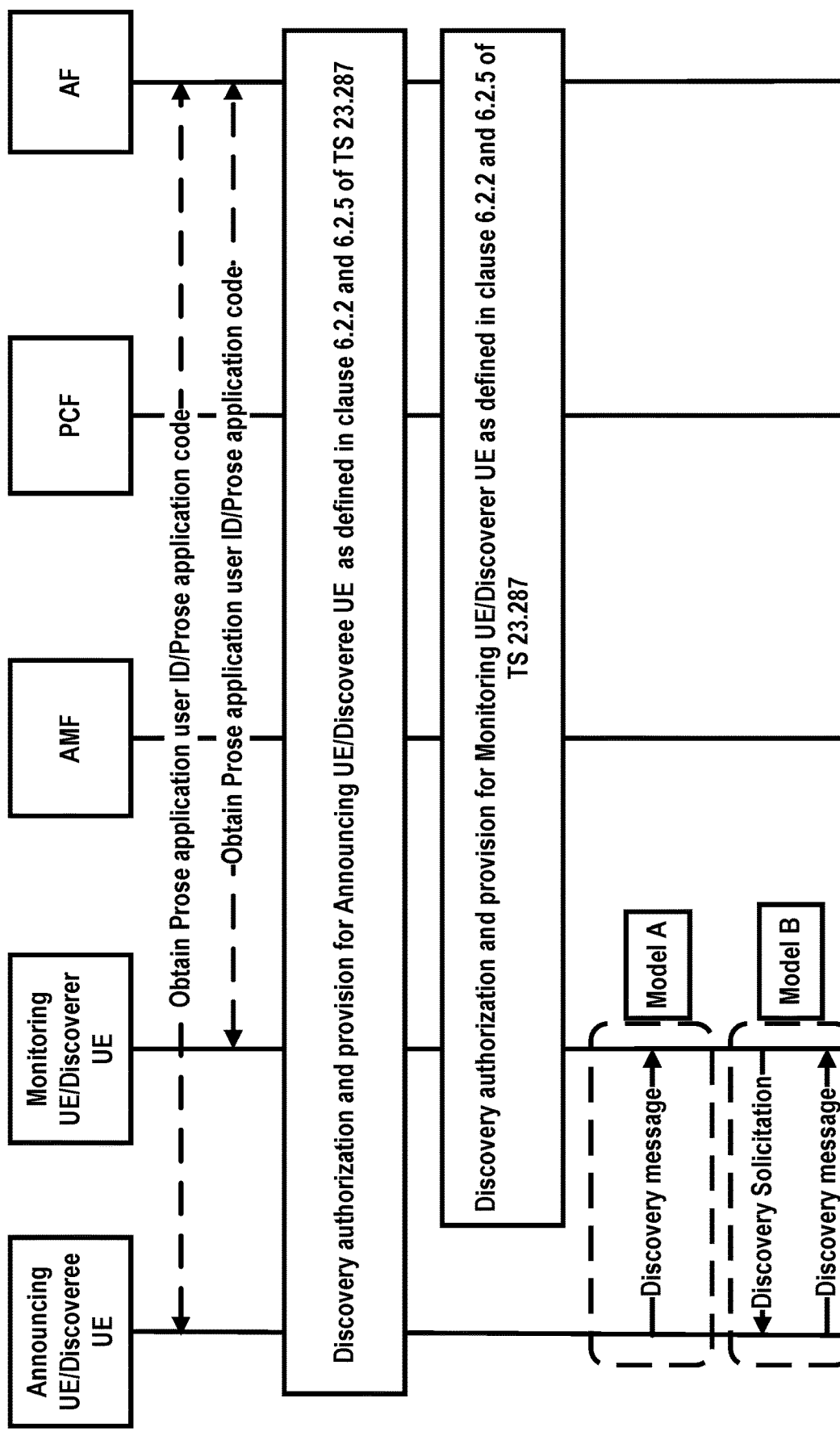
FIG. 15 is an example call flow as per an aspect of an embodiment of the disclosure.

In an example as depicted in FIG. 15, the 3GPP system may support a discovery procedure based on 5GC architecture, including authorization and provision, announcing and monitoring procedures, and protocol for discovery. In EPS, there are two types of ProSe Direct Discovery: open and restricted. Open discovery is the case where there is no explicit permission that is needed from the UE being discovered, whereas restricted discovery may take place with explicit permission from the UE that is being discovered. 3GPP systems may support two models for ProSe Direct Discovery: Model A and Model B. Model A may employ a single discovery protocol message (Announcement). Model B may employ two discovery protocol messages (Solicitation and Response). Model A may define/determine/employ two roles for the ProSe-enabled UEs that are participating in ProSe Direct Discovery. Announcing UE: The UE may announce certain information that may be employed by UEs in proximity that have permission to discover. Monitoring UE: may be the UE that monitors certain information of interest in proximity of announcing UEs. In model A the announcing UE may broadcast discovery messages at predefined discovery intervals and the monitoring UEs that are interested in these messages read them and process them. The announcing UE may broadcast information about itself e.g., its ProSe Application Code in the discovery message.

In an example, model B may be employed. When restricted discovery type is used, model A defines two roles for the ProSe-enabled UEs that are participating in ProSe Direct Discovery. Discoverer UE: The UE transmits a request comprising certain information about what it is interested to discover. Discoveree UE: The UE that receives the request message may respond with some information related to the discoverer's request. Model A is equivalent to "who is there/are you there" since the discoverer UE sends information about other UEs that would like to receive responses from, e.g. the information can be about a ProSe Application Identity corresponding to a group and the members of the group may respond.

In an example, for the direct discovery authorization and provision to the UE, an AF may provide the groups and/or service information to the PCF via NEF and the PCF may provide the authorization to the UE according to the received information from the AF.

The AF may send a request to a PCF (or via NEF) that may comprise the service information to be directly discovered over PC5 interface (the service information can contain, e.g. Application identifier, and/or the like), the group information (e.g. the external group identifier) to be directly discovered over PC5 interface, the information may be per announcing and monitoring direction for Mode A or per discoverer UE and discoveree UE for Mode B, the area information, and/or the like. In an example, the request may comprise a mobility restriction information element. The mobility restriction or relay mode mobility restriction may indicate a set of mobility restrictions of a wireless device, or a relay UE when the wireless device is acting as a relay (e.g., UE-to-Network relay mode). The mobility restriction may be a relay mode mobility restriction, ProSe mobility restriction, PC5 mobility restriction, and/or the like. The PCF may provision (e.g., send, transmit, deliver via NAS, and/or the like) to the UE one or more elements of the request message. The PCF may send to the UE one or more elements comprising the information contained based on the information received from the AF and local policy, the service information to be directly discovered over PC5 interface wherein the service information may comprise e.g. Application identifier, the group information (e.g. the external group identifier) to be directly discovered over PC5 interface, the area information used for direct discovery over PC5 interface, the mobility restriction information element for relay mode, relay mode mobility restriction, security parameters used for direct discovery over PC5, and/or the like.

In an example, the AMF may determine that the UE is authorised to direct discovery based on the authorised area information. The AMF may provide the UE authorization to use direct discovery over PC5 interface to corresponding NG-RAN during N2 establishment for the UE.

In an example as depicted in FIG. 15, a user (UE) may obtain ProSe application user ID and ProSe application code for ProSe direct discovery using application layer mechanisms. The application layer in the UE may provide application user ID and the application identifier to the ProSe Application Function. The ProSe Application Function may allocate a ProSe application user ID and ProSe application code to the application layer in the UE.

Figure 16:
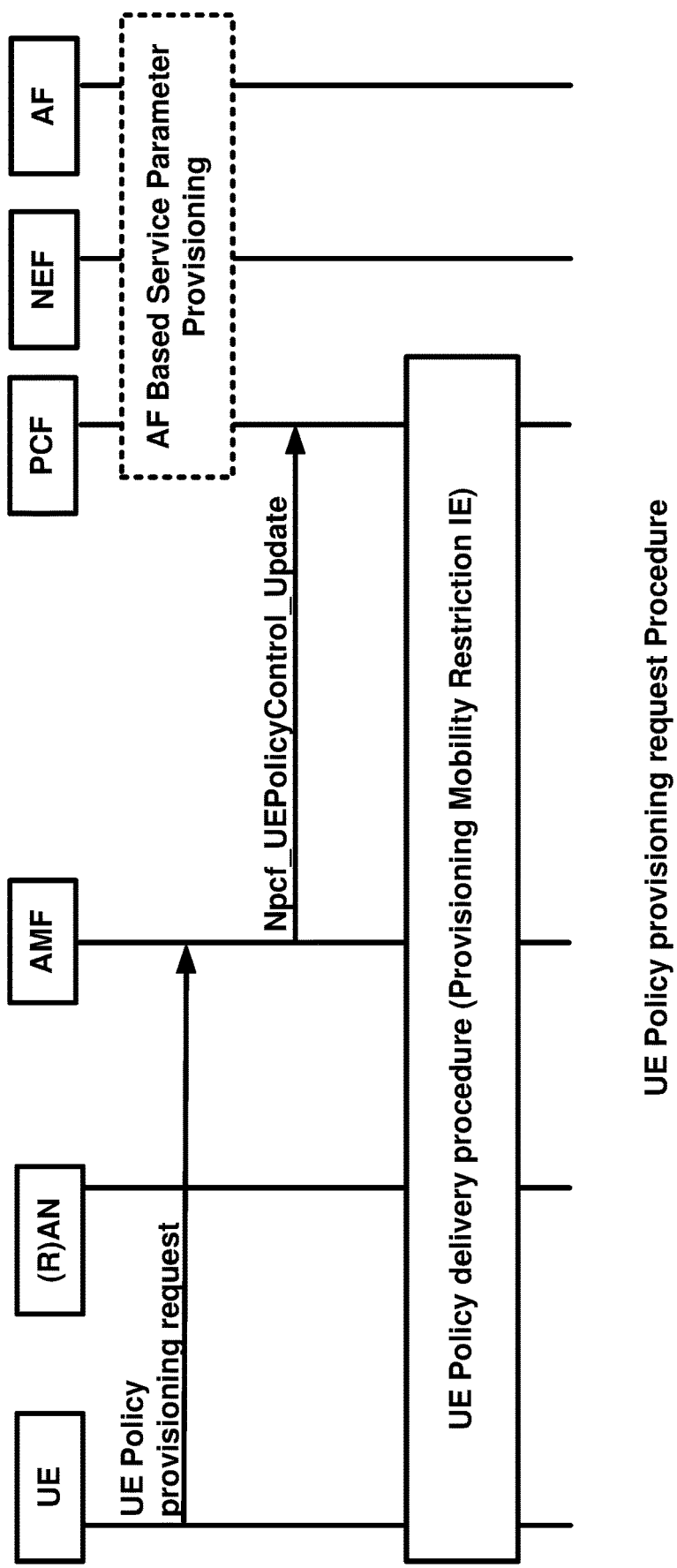
FIG. 16 is an example call flow as per an aspect of an embodiment of the disclosure.

As depicted in example FIG. 16, the UE obtains the authorization and provision for announcing discovery and/or for monitoring/solicitation discovery. The UE triggered Policy provisioning procedure may be initiated by the UE to request Policy/Parameter from the PCF when UE determines Policy/Parameter is invalid. The UE may send the UE Policy provisioning request including the UE Policy Container to the AMF. The AMF may send the Npcf_UEPolicyControl_Update request to the PCF including the UE Policy Container received from UE. The AF or Application Server may provision the 5GC with ProSe service parameters via NEF.

In an example as depicted in FIG. 15, when the announcing UE is triggered e.g. by an upper layer application to announce availability for associated groups and/or for associated applications, if the UE is authorised to perform the announcing UE procedure for the associated groups and/or the associated applications, then the UE may generate a PC5 direct discovery message for announcement and includes the following information in this message. ProSe UE ID e.g. ProSe application user ID, Layer 2 ID, the group ID(s) provided by the application layer, the application ID(s) or ProSe application code(s) provided the application layer, and/or the like. The announcing UE may compute a security protection element (e.g., for integrity protection) and appends it to the PC5 message. In an example, when the monitoring UE is triggered e.g. by an upper layer application or by the user to monitor proximity of other UEs for the associated group(s) and/or associated applications, and if the UE is authorised to perform the monitoring procedure for the group(s) and/or applications, then the UE may monitor the discovery message. The monitoring UE may verify the security protection element using the provisioned security parameters corresponding to the application. If the verification of the security protection element succeeds, the service is successfully discovered by the monitoring UE. The monitoring UE may then notify the application layer using the result of the discovery. When the discoverer UE is triggered e.g by an upper layer application or by the user to discover other UEs for the associated group(s) and/or associated applications, and if the UE is authorised to perform the discovery solicitation procedure for the group(s) and/or applications, then the UE may send solicitation message with the information of discoverer ProSe UE ID, application ID(s) or ProSe application code(s), group ID(s), and/or the like. The discoverer UE may compute a security protection element (e.g., for integrity protection) and appends it to the PC5 message. If the discoveree UE is able to and authorised to respond to the discovery solicitation according to the received information in the solicitation message, then may respond to the discovery message with the discoveree ProSe UE ID, the supported application ID(s) or ProSe application code(s) and group ID(s).

Figure 17:
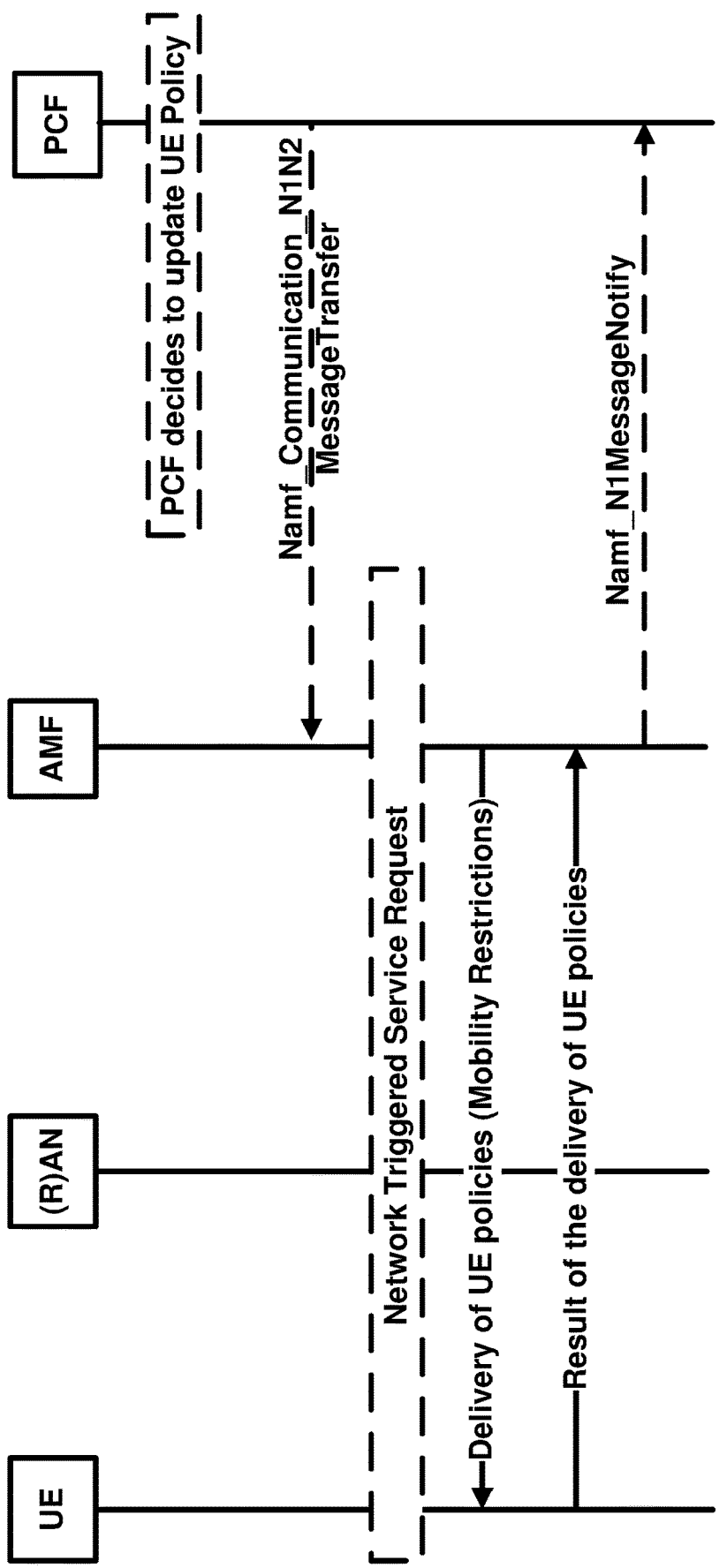
FIG. 17 is an example call flow as per an aspect of an embodiment of the disclosure.

In an example embodiment as depicted in FIG. 17, a PCF may determine to update a policy of a UE (e.g., a relay UE, a remote UE, and/or the like). The PCF may notify the AMF to deliver the policy update, or configuration update to the UE. The AMF may determine to notify, or page the UE if the UE is in idle state. The AMF may initiate a network triggered service request procedure and send the updated policy and configuration to the UE via a NAS message. The NAS message may comprise mobility restriction IE for the UE.

Figure 18:
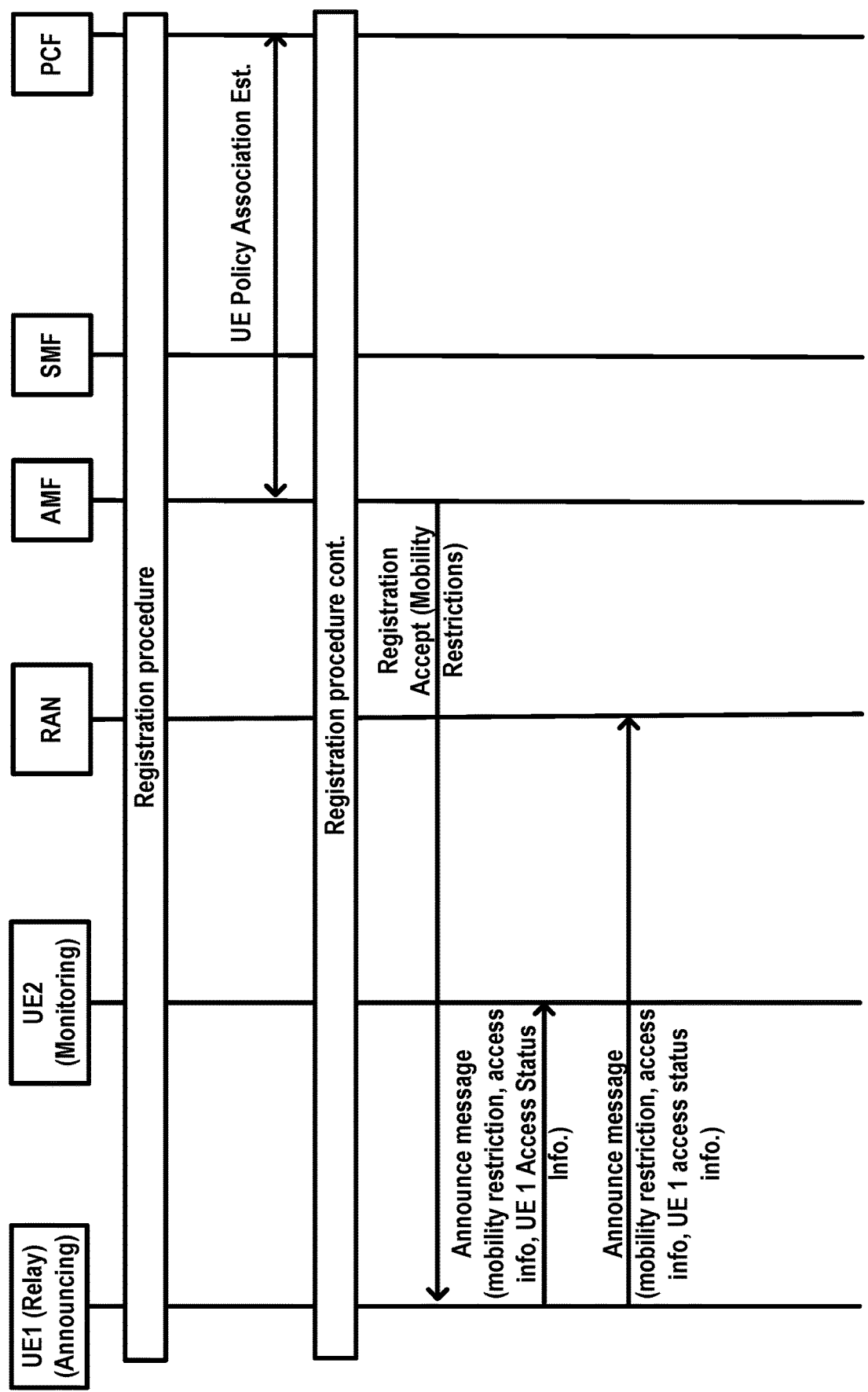
FIG. 18 is an example call flow as per an aspect of an embodiment of the disclosure.

In an example embodiment as depicted in FIG. 18, during a registration procedure of a UE (e.g., a relay UE, or remote UE), an AMF and a PCF may perform a policy association establishment procedure. The UE configuration or policy that may comprise mobility restrictions may be transmitted to the UE via a registration accept message. The mobility restriction IE may be employed by the UE during a relay discovery procedure, discovery announce procedure, solicitation messages, and/or the like.

Figure 19:
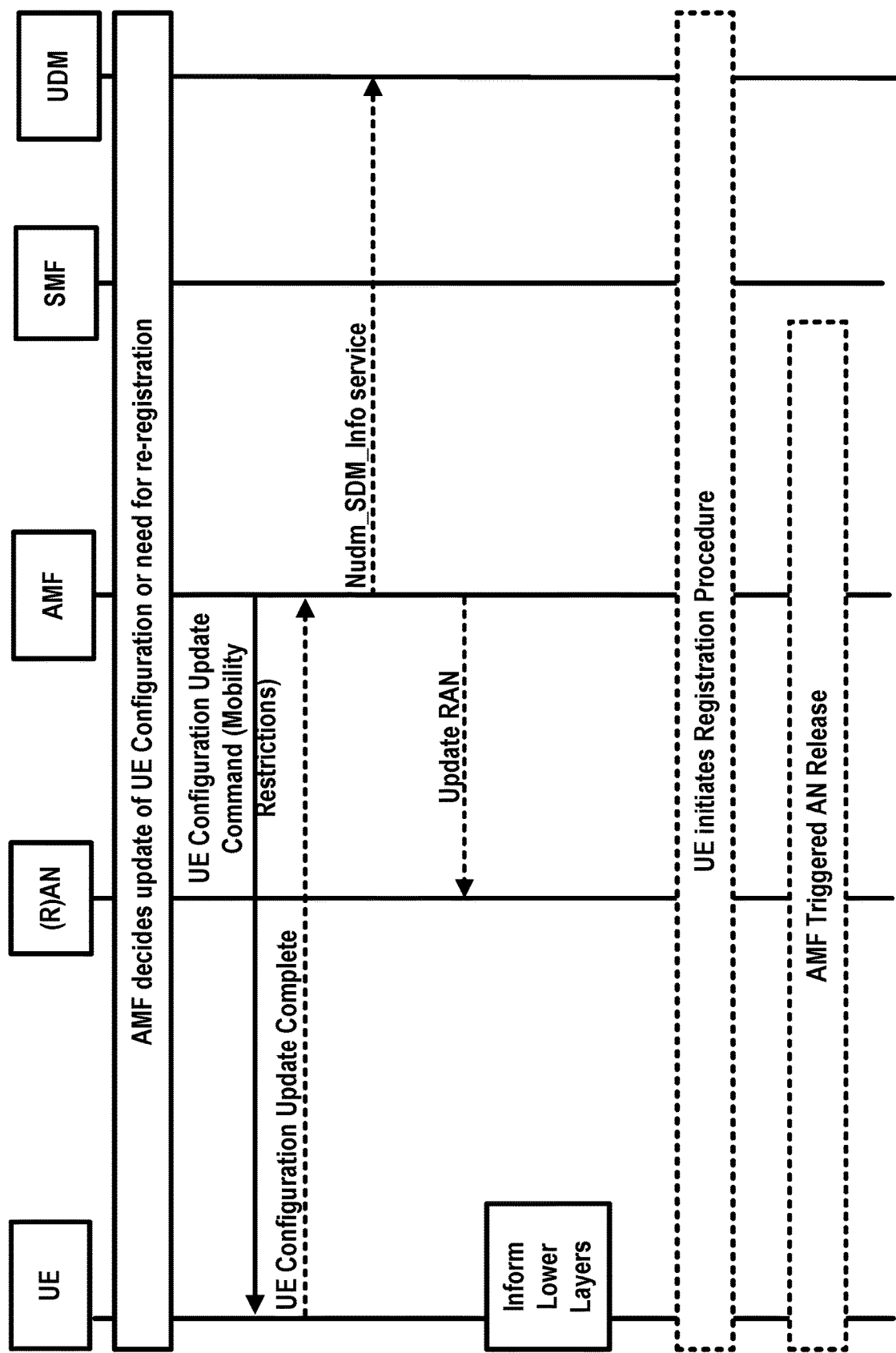
FIG. 19 is an example call flow as per an aspect of an embodiment of the disclosure.

In an example embodiment as depicted in FIG. 19, an AMF may determine the necessity of UE (e.g., relay UE or remote UE) configuration change due to various reasons (e.g., UE mobility change, NW policy, reception of Subscriber Data Update Notification from UDM, change of Network Slice configuration, need to assign PLMN-assigned UE Radio Capability ID) or that the UE needs to perform a registration procedure. If a UE is in CM-IDLE, the AMF can wait until the UE is in CM-CONNECTED state or triggers network triggered service request. The AMF may include Mobility Restriction List in N2 message that delivers UE Configuration Update Command to the UE if the service area restriction for the UE is updated. The AMF may send UE configuration update command containing one or more UE parameters (Configuration Update Indication, 5G-GUTI, TAI List, Allowed NSSAI, Mapping Of Allowed NSSAI, Configured NSSAI for the Serving PLMN, Mapping Of Configured NSSAI, rejected S-NSSAIs, NITZ, Mobility Restrictions, LADN Information, MICO, Operator-defined access category definitions, SMS Subscribed Indication, [PLMN-assigned UE Radio Capability ID], [PLMN-assigned UE Radio Capability ID deletion indication]) to UE. The AMF may update the rejected S-NSSAIs in the UE Configuration Update command. The AMF may include one or more of 5G-GUTI, TAI List, Allowed NSSAI, Mapping Of Allowed NSSAI, Configured NSSAI for the Serving PLMN, Mapping Of Configured NSSAI, rejected S-NSSAIs, NITZ (Network Identity and Time Zone), Mobility Restrictions parameters, LADN Information, Operator-defined access category definitions, PLMN-assigned UE Radio Capability ID, or SMS Subscribed Indication if the AMF wants to update these NAS parameters without triggering a UE registration procedure. The AMF may include in the UE Configuration Update Command a Configuration Update Indication parameters indicating whether Network Slicing Subscription Change has occurred, the UE may acknowledge the command, or whether a Registration procedure is requested. If the AMF indicates Network Slicing Subscription Change, then the UE may locally erase all the network slicing configuration for all PLMNs and, if applicable, update the configuration for the current PLMN based on any received information. The UE may initiate an appropriate registration procedure after the UE enters CM-IDLE state and does not include the 5G-S-TMSI or GUAMI in Access Stratum signalling. If there is an established PDU Session associated with emergency service and the UE has received an indication to perform the Registration procedure, the UE may initiate the Registration procedure only after the PDU Session associated with emergency service is released.

In existing technologies, 3GPP communication systems may support ProSe communication, UE-to-network relay communication, and/or the like. ProSe communication, PC5 communications, relay-based methods may be employed by group communications, V2X communications, and/or the like. In an example, when a UE is connected to a network, the UE may detect that it is out of coverage, or signal strength is not sufficient to connect to the network. The UE may determine to connect to the network via a UE (a relay UE) that is connected to the network. 3GPP communication systems may support path switch from Uu to relay and from relay to Uu path.

In order to perform the path switch, a first wireless device may be selected to operate as a relay for a second wireless device. The first wireless device be referred to, for example, as a relay wireless device. The second wireless device may be referred to, for example, as a remote wireless device. After the relay is set up, the remote wireless device may communicate with the network via the relay wireless device.

The process for setting up a relay path between the remote wireless device and a particular relay wireless device (e.g., switching from Uu path to relay path) may involve significant signaling and/or delay. There may be a plurality of candidate wireless devices that are configured and/or prepared to operate as a relay, and the remote wireless device may exchange signaling with any/all of the candidates. The selection process (e.g., vetting of the candidates) may involve consumption of processing power by the remote wireless device. After a particular relay wireless device is selected from among the candidates, additional signaling is required to perform the path switch. Accordingly, the process of setting up a relay path involves significant resource consumption on the part of the wireless devices and significant signaling overhead within the network.

In existing technologies, the remote wireless device may be associated with restrictions that prohibit and/or prevent the remote wireless device from accessing the network via a particular relay path. For example, the remote wireless device may select a relay wireless device that is connected to the network via an access that is forbidden for the remote wireless device. The wireless devices may be configured with mobility restrictions that are in conflict or not compatible. The remote wireless device and the relay wireless device may be connected to the network via different accesses e.g., different cells, CAG, RAT, and/or the like. The requirements of a wireless device acting as a relay may not be in accordance or compatible with those of the remote wireless device. In an example, the relay wireless device may be a CAG-only UE. When the relay wireless device moves to a non-CAG cell, the remote wireless device may experience service interruption. When a remote wireless device establishes a relay connection or PC5 connection with a relay wireless device and the mobility restrictions are not compatible e.g., due to violation of service area, tracking area, CAG information, RAT restrictions, core network restrictions, allowed network slices, and/or the like, the connection or session establishment/modification may fail and lead to inefficient resource utilization. The relay wireless device may be configured with mobility restrictions that are not in accordance with those of the remote wireless device. In an example, when layer 2 relay is employed, the relay UE may forward the request to the network and the network may reject the request. In an example, when layer 3 relay is employed, the relay UE may establish a new PDU session or modify an existing PDU session for the remote UE data transmission. For Service Area Restriction, the Remote UE also needs to be informed when the UE-to-Network Relay UE enters a non-allowed area since relay operations is not possible in a non-allowed area. The UE-to-Network may release the PC5 unicast connection with the appropriate cause code and service interruption may be incurred. In existing technologies, the relay path (and/or the completion of the relay path setup procedure) may fail for one or more of the aforementioned reasons, and the remote wireless device may experience delay. The remote wireless device may attempt to set up a new relay path, causing additional resource consumption on the part of the wireless devices and additional signaling overhead within the network. The new relay path may also fail (e.g., for the same reasons), causing the path switch process to repeat indefinitely without success.

Example embodiments provide mechanisms to coordinate mobility restriction and/or access status information of a first wireless device (e.g., a relay or in-coverage wireless device) and a second wireless device (e.g., a remote or out-of-coverage wireless device). For example, mobility restriction and/or access status information of a relay wireless device may be obtained by a remote wireless device prior to setting up a relay path. The information may expedite the selection, by the remote wireless device, of a suitable relay wireless device that is likely to provide an enduring connection, thereby increasing the speed, efficiency, and/or efficacy of the relay path setup process.

In an example, a closed access group (CAG) may relate to a non-public network, a private network, or the like. For example, the CAG may be associated with a corporate, industrial, or government concern, may serve a small geographic range and/or narrow class of wireless devices, and/or may engage in regulated (e.g., privileged or secret) communications. The CAG may comprise one or more cells for establishing communication (e.g., over an air interface). The network (e.g., base stations) may control access to the CAG cells, for example, by blocking access of wireless devices that are not part of the CAG (i.e., non-CAG wireless devices). Moreover, wireless devices associated with the CAG may be configured to refrain from accessing non-CAG cells.

As an illustrative example of one possible CAG use case, suppose that a manufacturer installs a network (e.g., base station, etc.) on a factory floor. The network is for communicating with manufacturing equipment owned by the manufacturer, which are configured as wireless devices. The manufacturer may implement the network as a CAG network with CAG identifier #xyz. The manufacturer may configure the base station so that it supports CAG-only cells, for example, cells that only permit network access to wireless devices that are associated with CAG #xyz. The manufacturer may further configure the wireless devices as "CAG-only" wireless devices, so that they are not able to access cells that are outside the CAG (i.e., outside the factory). For example, the factory machinery (i.e., CAG-only wireless devices) may be in a coverage area of a cell of a Verizon base station built in the neighborhood of the factory (a non-CAG cell), but because the factory machinery is CAG-only, it may be configured to refrain from accessing the Verizon cell.

Closed access groups (CAGs) are distinct from closed subscriber groups (CSGs) in several respects. For example, a base station with CSG capability may configure a first cell that is open to all wireless devices (open or unrestricted), and a second cell that is only open to subscribing wireless devices (restricted to a CSG). However, there is no concept in CSG of a "CSG-only" wireless device, for example, a wireless device that is only allowed to access a cell associated a CSG and/or configured to refrain from accessing cells which do not implement CSG. For example, a wireless device would not be restricted from accessing the first cell merely because it is not implementing CSG (open or unrestricted). This would be true regardless of whether the wireless device has valid subscription information (making it capable of accessing the second cell) and/or is generally capable of implementing CSG functionality.

In an example, when a relay wireless device provides mobility restriction and/or access status information during discovery, the remote wireless devices may select an appropriate relay node based on the information.

In an example, a first wireless device (e.g., a candidate relay wireless device) may transmit a discovery message. For example, the discovery message may comprise an indication that the first wireless device is only allowed and/or only allowed to access a cell associated with at least one CAG (e.g., mobility restriction information, access status information, a parameter indicating that the first wireless device is only allowed to access a cell associated with at least one CAG, and/or a CAG-only indication). In an example, the discovery message may be received by a second wireless device. The indication may be used, by the second wireless device, to select a relay (e.g., a relay wireless device that is likely to provide a stable and/or unrestricted connection). The relay may be the first wireless device. The second wireless device may send, to the first wireless device, a connection request. The sending of the request may be based on the selecting of the first wireless device as the relay. If the first wireless device had not been allowed to access CAG cells, then the sending of the connection request to the second wireless device would have served no purpose. Accordingly, by providing the indication and/or determining the connection request based on the indication, network resources are conserved and/or delay and power consumption are reduced.

In an example, a first wireless device (e.g., a candidate relay wireless device) may transmit a discovery message. For example, the discovery message may comprise an indication that the first wireless device is allowed to access a CAG cell associated with a CAG identifier. In an example, the discovery message may be received by a second wireless device. The second wireless device may be allowed and/or only allowed to access a cell associated with the CAG identifier. The indication may be used, by the second wireless device, to select a relay (e.g., a relay wireless device that is likely to provide a stable and/or unrestricted connection). The relay may be the first wireless device. Based on the first wireless device being allowed to access a CAG cell associated with a CAG identifier, the second wireless device may send, to the first wireless device, a connection request. The sending of the request may be based on the selecting of the first wireless device as the relay. Accordingly, by providing the indication and/or determining the connection request based on the indication, network resources are conserved and/or delay and power consumption are reduced.

In an example, a first wireless device (e.g., a candidate relay wireless device) may receive a discovery solicitation message from a second wireless device (e.g., a remote wireless device). The discovery solicitation message may comprise an indication that the second wireless device is allowed and/or only allowed to access a cell associated with at least one CAG (e.g., mobility restriction information, access status information, a parameter indicating that the second wireless device is only allowed to access a cell associated with at least one CAG, and/or a CAG-only indication). The first wireless device may be allowed to access CAG cells. Based on the first wireless device being allowed to access CAG cells, the first wireless device may transmit a discovery message to the second wireless device. If the first wireless device had not been allowed to access CAG cells, then the sending of the discovery message to the second wireless device would have served no purpose. Accordingly, by providing the indication and/or determining the discovery message based on the indication, network resources are conserved and/or delay and power consumption are reduced.

In an example, a first wireless device (e.g., a candidate relay wireless device) may receive a discovery solicitation message from a second wireless device (e.g., a remote wireless device). The discovery solicitation message may comprise an indication that the second wireless device is allowed and/or only allowed to access a CAG cell associated with a CAG identifier. The first wireless device may be allowed to access a cell associated with the CAG identifier. Based on the first wireless device being allowed to access the CAG associated with the CAG identifier, the first wireless device may transmit a discovery message to the second wireless device. If the first wireless device had not been allowed to access the CAG associated with the CAG identifier, then the sending of the discovery message to the second wireless device would have served no purpose. Accordingly, by providing the indication and/or determining the discovery message based on the indication, network resources are conserved and/or delay and power consumption are reduced.

In an example, a first wireless device may have a connection with a second wireless device (e.g., the first wireless device is a relay wireless device and the second wireless device is a remote wireless device). The first wireless device may receive, from a base station, a configuration update comprising an indication that the second wireless device is allowed and/or only allowed to access a cell associated with at least one CAG (e.g., mobility restriction information, access status information, a parameter indicating that the second wireless device is only allowed to access a cell associated with at least one CAG, and/or a CAG-only indication). The first wireless device may transmit the indication to the second wireless device. Based on the indication, the second wireless device may release the connection with the first wireless device. The releasing may be based on the second wireless device not being allowed to access the cell associated with the at least one CAG. The first wireless device may release the connection with the second wireless device. By providing the indication and/or determining the release based on the indication, network resources are conserved and/or delay and power consumption are reduced.

In an example embodiment, a mobility restriction may be a relay mode mobility restriction. The relay mode mobility restriction may be employed to determine a set of access, service, and mobility rules or restrictions for a wireless device when acting as relay node or accessing a network via a relay node (such as a remote UE).

Figure 20:
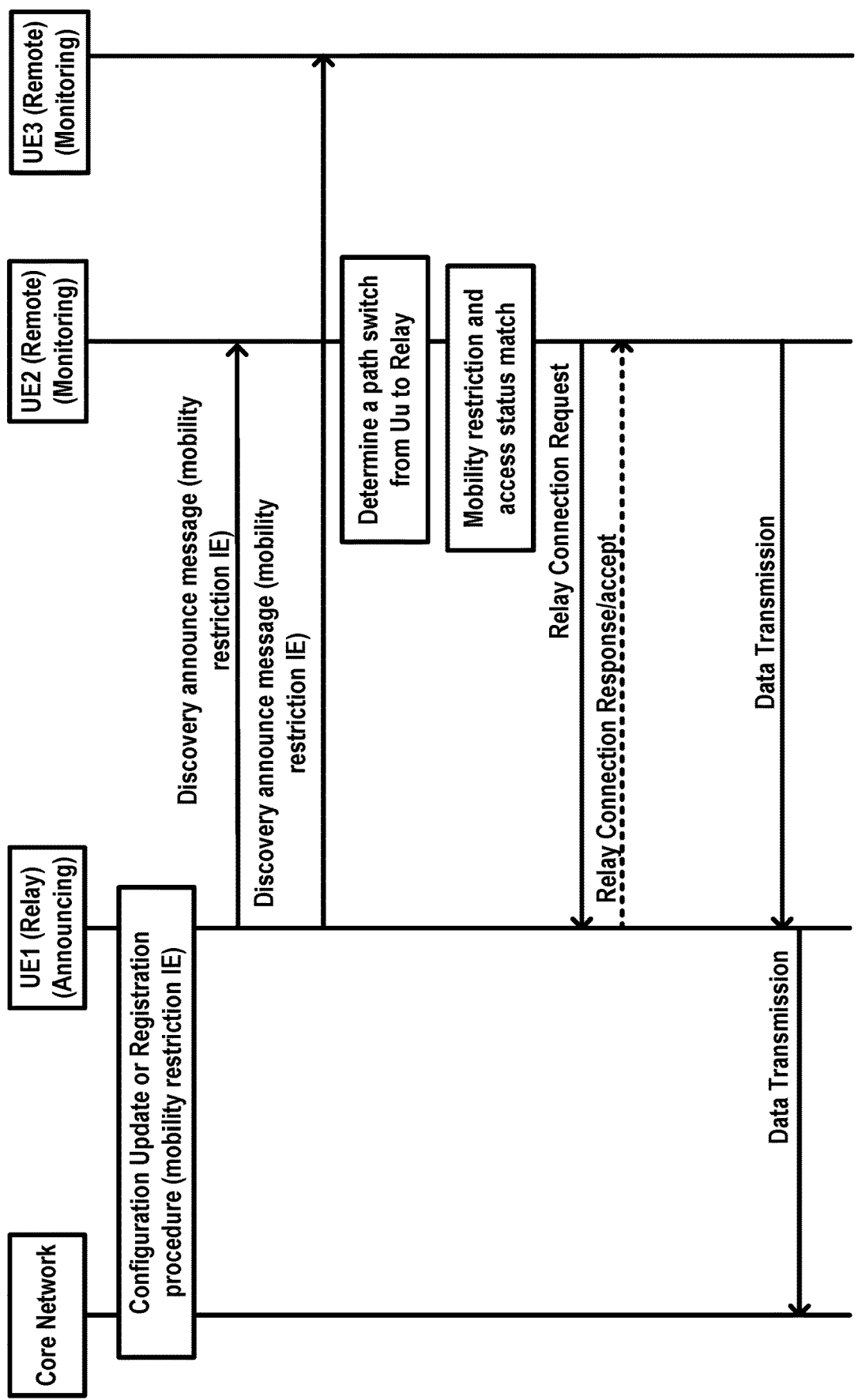
FIG. 20 is an example call flow as per an aspect of an embodiment of the disclosure.

In an example embodiment as depicted in FIG. 20, a first wireless device (e.g., a wireless device/UE acting as a relay node, or UE-to-Network relay) may receive mobility restrictions from a network. The mobility restrictions may be received during a configuration update message, UE configuration update procedure, registration procedure, registration accept message, and/or the like. The first wireless device may send a discovery message, discovery announce message, announce message, and/or the like to one or more wireless devices (UEs). The discovery announce message may be sent via a broadcast message, multicast message, anycast message, groupcast message, and/or the like. The discovery announce message may comprise a mobility restriction information element, a relay mode mobility restriction, and/or the like. The discovery message may comprise an access status of the first wireless device (relay UE, or a relay node).

In an example as depicted in FIG. 20, the first wireless device may send a discovery announce message comprising mobility restrictions. The first wireless device may send the discovery announce message to one or more second wireless devices. The one or more second wireless devices may be one or more remote wireless devices (remote UEs). A remote UE may be a UE that may access the network via a UE-to-network relay UE. The remote UE may be connected directly via a Uu interface. When a remote UE is out of coverage or determines to change or switch path from Uu to relay path, the remote UE may establish a connection with the network via a relay UE (e.g., UE-to-network relay UE). The remote UE may establish a PC5 connection with a relay UE. As depicted in FIG. 20, the remote UE (UE #2) may monitor for discovery announce messages received from one or more relay UEs. When UE #2 determines to switch path from Uu connection to relay connection the remote UE may compare the mobility restrictions received via the discovery announce message with the mobility restrictions of the UE #2. The comparison may be based on one or more elements of the mobility restriction. For example, if the CAG information of the relay UE do not match with the remote UE (UE #2), it may indicate that the remote UE is not allowed to access the network via the CAGs that the relay UE is accessing the network. In an example, RAT restrictions of the relay UE may be taken into account by the remote UE. The remote UE based on subscription information and/or the like may be allowed to access the PLMN using a RAT that is not allowed for the relay UE. In an example, a forbidden area of the remote UE may indicate that in the forbidden area, the remote UE is not allowed to initiate communication for the PLMN or NPN. If the allowed area of the remote UE is forbidden for the remote UE, the relay UE may not be selected by the remote UE.

In example embodiments the first wireless device and/or the second wireless device may perform a comparison, matching algorithm, and/or the like based on one or more elements of mobility restriction or access status information or a combination thereof. In an example, matching and/or comparison may be similarity check, saliency check, partial or full mapping/matching, of elements of the compared objects. For example, for an element indicating an allowed action/parameter, a full or partial overlap may result in a match. For an element with a negative requirement such as forbidden area or restricted access or RAT, an inverse set of elements may be fully or partially overlapped. For example, to compare RAT restriction elements, the remote UE, relay UE, the first wireless device, the second wireless device, and/or the like may perform a matching or comparison algorithm that returns a positive result when RAT restriction list of one does not match or correspond with the allowed RAT of the other.

In an example as depicted in FIG. 20, a second wireless device (UE), or a remote UE that is monitoring the relay node/UE announcements may determine to select a relay UE. When the second wireless device selects the remote UE (e.g., UE #1), the second wireless device may send a PC5 connection request, a relay connection request, and/or the like. The relay connection request may comprise a mobility restriction of the second wireless device. The relay connection request may comprise an access status information of the second wireless device e.g., when employing Uu direct connection with the network.

Figure 21:
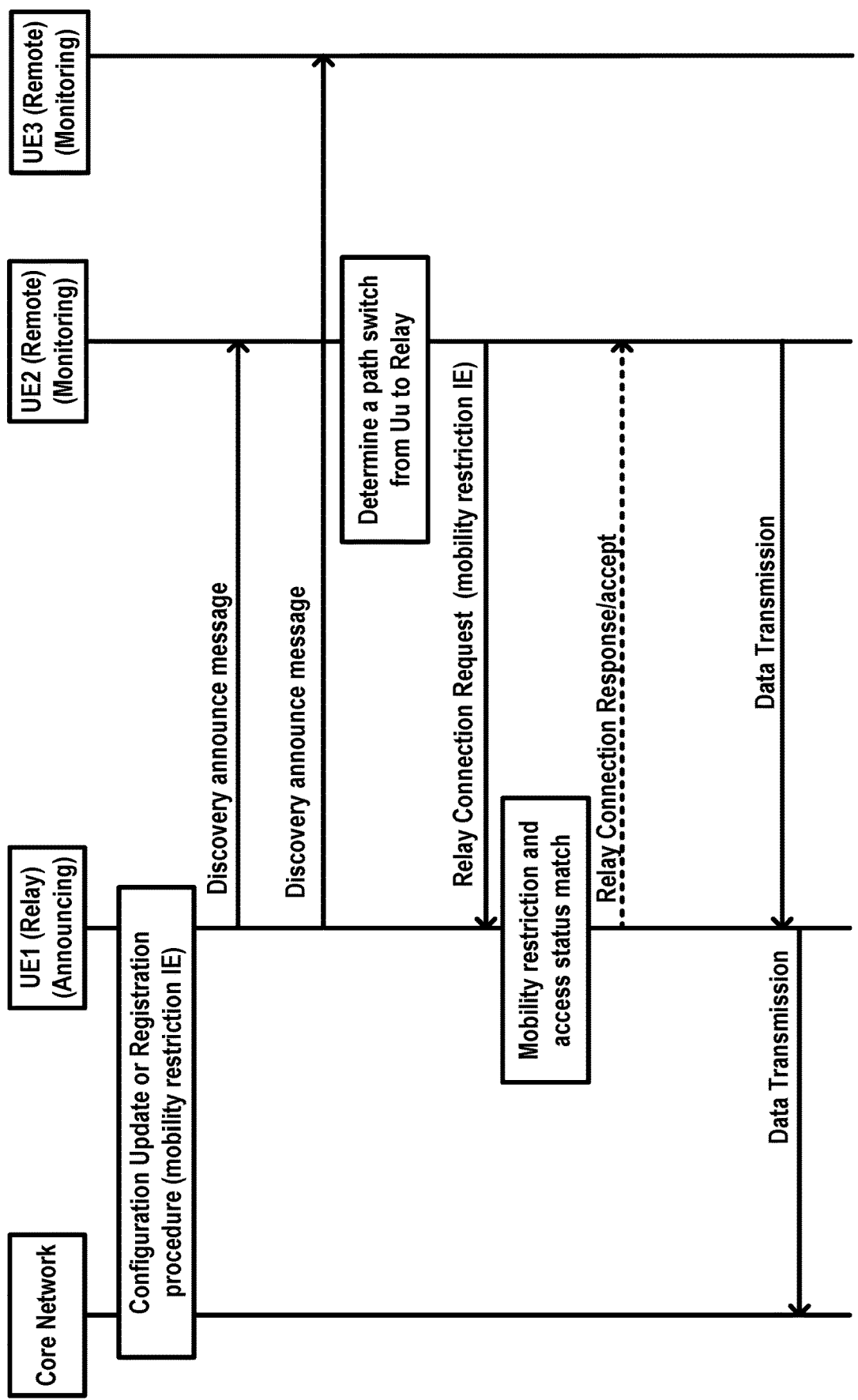
FIG. 21 is an example call flow as per an aspect of an embodiment of the disclosure.

In an example as depicted in FIG. 21, a first UE may send a discovery announce message to a plurality of second wireless devices (remote UEs). A second wireless device, or a remote UE that is monitoring the relay node/UE announcements may determine to send a connection request (e.g., PC5 connection request, relay connection request, and/or the like) to the relay UE. The connection request may comprise the mobility restriction or access status of the second wireless device (e.g., while connected via Uu). The first wireless device may respond with an accept indication based on the matching or comparison algorithm/procedure and the mobility restriction of the first wireless device (relay UE) and a connection status of the first wireless device.

Figure 22:
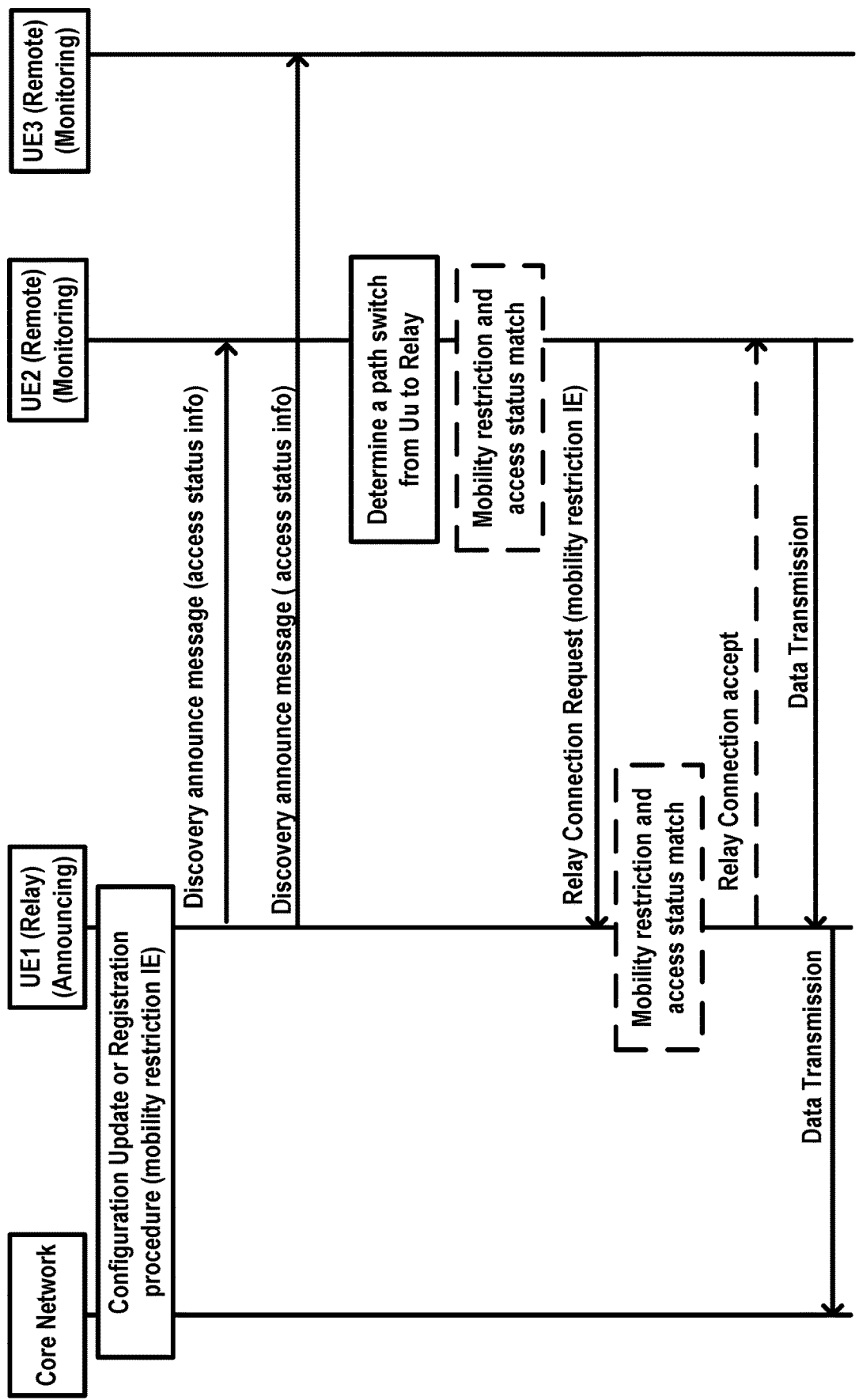
FIG. 22 is an example call flow as per an aspect of an embodiment of the disclosure.

In an example embodiment as depicted in FIG. 22, the discovery announce message may comprise an access status information of the first wireless device (the relay UE). The discovery announce message may comprise a mobility restriction of the first wireless device. The second wireless device may determine to perform a path switch from Uu to relay and establish a connection via the second wireless device by employing a PC5 connection, relay connection, and/or the like. The second wireless device may send a response message to the first wireless device based on an element of the discovery announce message to request a relay connection or a PC5 connection. The response message may comprise mobility restriction of the second wireless device. The response message may comprise an access status of the second wireless device. The first wireless device may determine to grant/accept the connection (relay connection) based on the matching or comparison of the mobility restriction, access status information or a combination thereof, and/or the like.

Example embodiments may comprise direct discovery procedures for ProSe communication. The following functions for commercial and/or public safety direct discovery may be supported: UE-to-Network relay discovery, determination is needed regarding within the ProSe Communication which user(s) are in ProSe Communication range at any given time (may be referred to as group member discovery). Group member discovery may be a form of restricted discovery type in that users that are affiliated with each other are able to discover each other (e.g., users sharing the same discovery group ID). The parameters for Group Member Discovery, as well as the overall procedure, are different from the restricted discovery for non-Public Safety use. UE-to-Network Relay discovery may employ pre-provisioned parameters to first discover a UE-to-Network Relay, and a subsequent communication link establishment. This makes the overall discovery procedure as restricted type, in that remote UEs with valid credentials and some form of pre-affiliation are able to successfully complete the overall procedure. Public Safety discovery for ProSe UE-to-Network Relay Discovery and Group Member Discovery may employ a PC5-D protocol stack. In the case of direct discovery for public safety (e.g., UE-to-Network Relay Discovery and Group Member Discovery), a ProSe Restricted Code is not used, and UEs use pre-configured or provisioned information for the Discovery procedures. Additional information not directly used for discovery may be advertised using the PC5-D protocol stack, like relayed temporary mobile group identity (TMGIs), the E-UTRAN Cell Global Identifier (ECGI) of the service cell, and/or the like in single or separate discovery messages of type e.g., relay discovery additional information. In an example, Model A and Model B discovery may be supported. Model A may employ a single discovery protocol message (Announcement). Model B may employ two discovery protocol messages (Solicitation and Response).

In an example, during a UE-to-Network Relay Discovery procedure, a ProSe UE-to-Network Relay (e.g., the first wireless device, relay UE, and/or the like) may send a UE-to-Network Relay discovery announcement message. The discovery announce message may comprise mobility restriction or one or more elements of the mobility restriction IE, access status information, and/or the like. The discovery announce message may comprise ProSe Relay UE ID e.g., a link layer identifier that may be employed for direct communication and may be associated with a relay service code. A UE-to-Network Relay may have a distinct ProSe Relay UE ID for each relay service code. For support of multiple PDU sessions or PDN connections, the ProSe UE-to-Network Relay may be assigned a different ProSe Relay UE ID for each PDU session or PDN Connection, announcer info that may provide information about the announcing user, relay service code that may be a parameter identifying a connectivity service the ProSe UE-to-Network Relay provides to Public Safety applications, or commercial applications. The relay service codes may be configured in a ProSe UE-to-Network Relay for advertisement. The relay service code may identify authorized users the ProSe UE-to-Network relay would offer service to, and may select the related security policies or information e.g., necessary for authentication and authorization between the remote UE (the second wireless device), and the ProSe UE-to-Network Relay (e.g., a Relay Service Code for relays for police members only would be different than a Relay Service Code for relays for Fire Fighters only, even though potentially they provided connectivity to same data network, DNN or APN e.g., to support Internet Access).

In an example, for group member discovery, the announcing UE (e.g., the first wireless device, the second wireless device, relay UE, remote UE, and/or the like) may send a group member discovery announcement message. The discovery announcement message may comprise ProSe UE ID that may be a link layer identifier that is used for subsequent direct one-to-one and one-to-many communication, Announcer Info that may provide information about the announcing user, discovery group ID that may be an identifier of a discovery group that the UE belongs to, mobility restriction or one or more elements of the mobility restriction IE, access status information, and/or the like.

For Relay Discovery Additional Information, the ProSe UE-to-Network Relay may send a relay discovery additional information message. The Relay Discovery Additional Information message may comprise relay service code that may be associated with the message. The Relay Service Code may be employed to identify the security parameters needed by the receiving UE to process the discovery message. ProSe Relay UE ID that may comprise a link layer identifier that is used for direct communication and may be associated with a Relay Service Code, announcer info that may provide information about the announcing user, TMGI that may indicate the MBMS the ProSe UE-to-Network Relay is relaying, ProSe Layer-2 Group ID that may be a link layer identifier of the group that transmits the MBMS traffic corresponding to the TMGI, ECGI that may indicate the ECGI of the serving cell of the ProSe UE-to-Network Relay, mobility restriction IE, access status information, and/or the like. In an example, a single relay discovery additional information message may comprise the ECGI that the ProSe UE-to-Network Relay is camped on, one or more advertised TMGIs and their corresponding ProSe Layer-2 Group IDs up to the maximum allowed message size, the ECGI that the ProSe UE-to-Network Relay is camped on, and one or more advertised TMGIs and their corresponding ProSe Layer-2 Group IDs up to the maximum allowed message size, mobility restriction IE, access status information, and/or the like.

Figure 23:
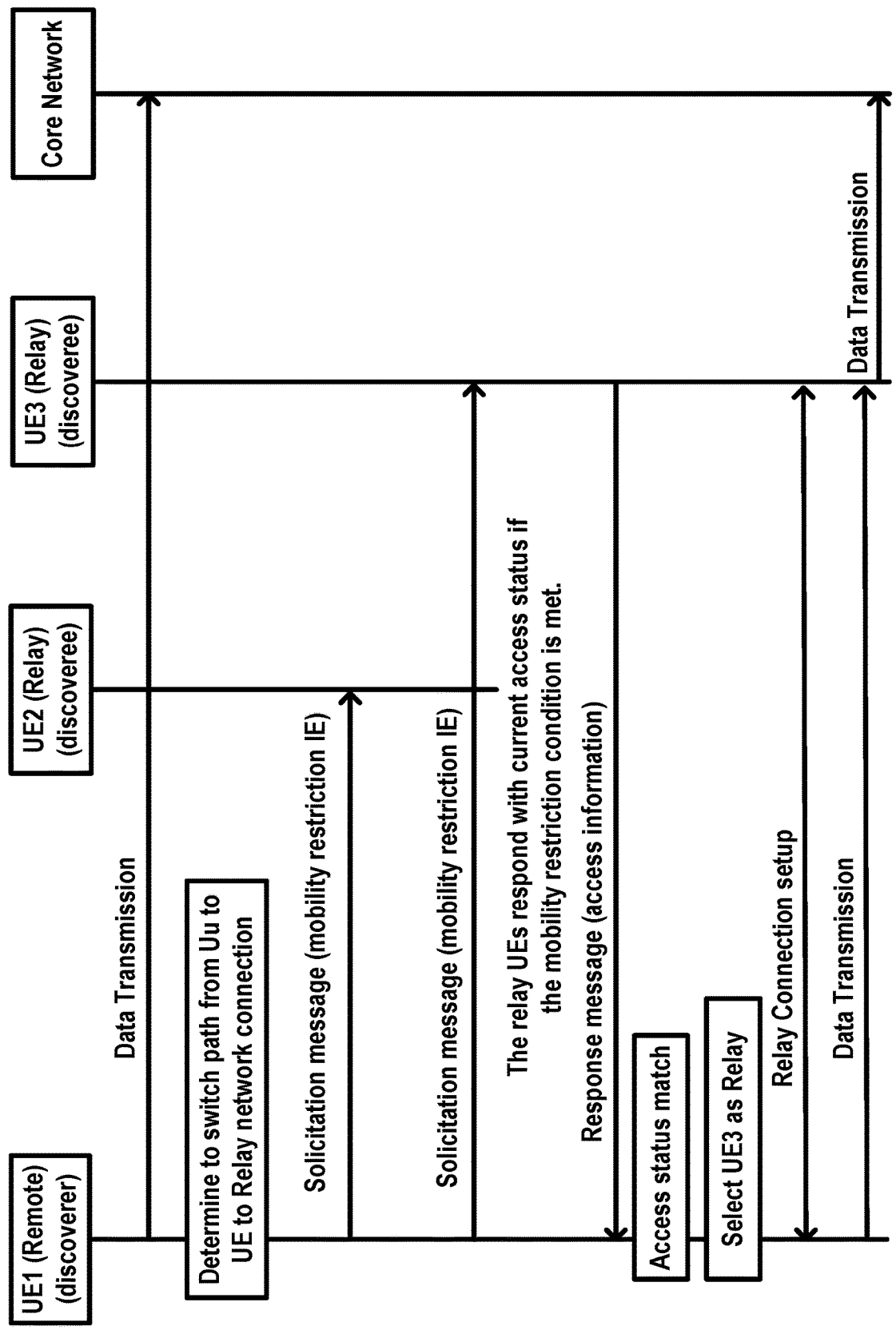
FIG. 23 is an example call flow as per an aspect of an embodiment of the disclosure.

In an example, FIG. 23 may depict model B discovery. In an example, when model B is employed, the remote UE (e.g., the second wireless device) may send a UE-to-Network Relay discovery solicitation message comprising discoverer information that may provide information about the discoverer user, relay service code that may comprise information about connectivity that the discoverer UE is interested in (the relay service codes may be configured in the Remote UEs interested in related connectivity services), ProSe Relay UE ID that may be a link layer identifier of a UE-to-Network Relay that is used for direct communication and may be associated with a Relay Service Code (A UE-to-Network Relay may have a distinct ProSe Relay UE ID for each Relay Service Code), mobility restriction, access status information, and/or the like.

The ProSe UE-to-Network Relays (e.g., the one or more first wireless device(s), the one or more relay UEs, and/or the like) that match the values of the relay service code contained in the solicitation message may respond to the Remote UE with a UE-to-Network relay discovery response message. The UE-to-Network relay discovery response message may comprise a ProSe Relay UE ID that may be a link layer identifier that may be employed for direct communication and may be associated with a relay service code (A UE-to-Network Relay may have a distinct ProSe Relay UE ID for each Relay Service Code), discoveree Information that may provide information about the discoveree. The UE-to-Network relay discovery response message may comprise mobility restriction IE, access status information, and/or the like.

In an example, for group member discovery, the discoverer UE may send a group member discovery solicitation message. The Group Member Discovery Solicitation message may comprise mobility restriction IE, access status information, discoverer Information that may provide information about the discoverer user, Discovery Group ID that may be an identifier of a discovery group that the targeted UE may belong to, target Information that may provide information about the targeted discoverees (single user or group), and/or the like. The target information may be provided by the upper layers of the UE.

In an example, the discoveree UEs (e.g., relay UEs, first wireless device, and/or the like) that match the values of the parameters contained in the solicitation message based on the discovery group ID, may respond to the discoverer UE with a group member discovery response message. The group member discovery response message may comprise the mobility restriction IE, access status information, a ProSe UE ID that may be a link layer identifier that is used for subsequent direct one-to-one and one-to-many communication, discoveree Information that may provide information about the discoveree, discovery group ID that may be an identifier of the discovery group that the discoveree UE belongs to, and/or the like.

Figure 24:
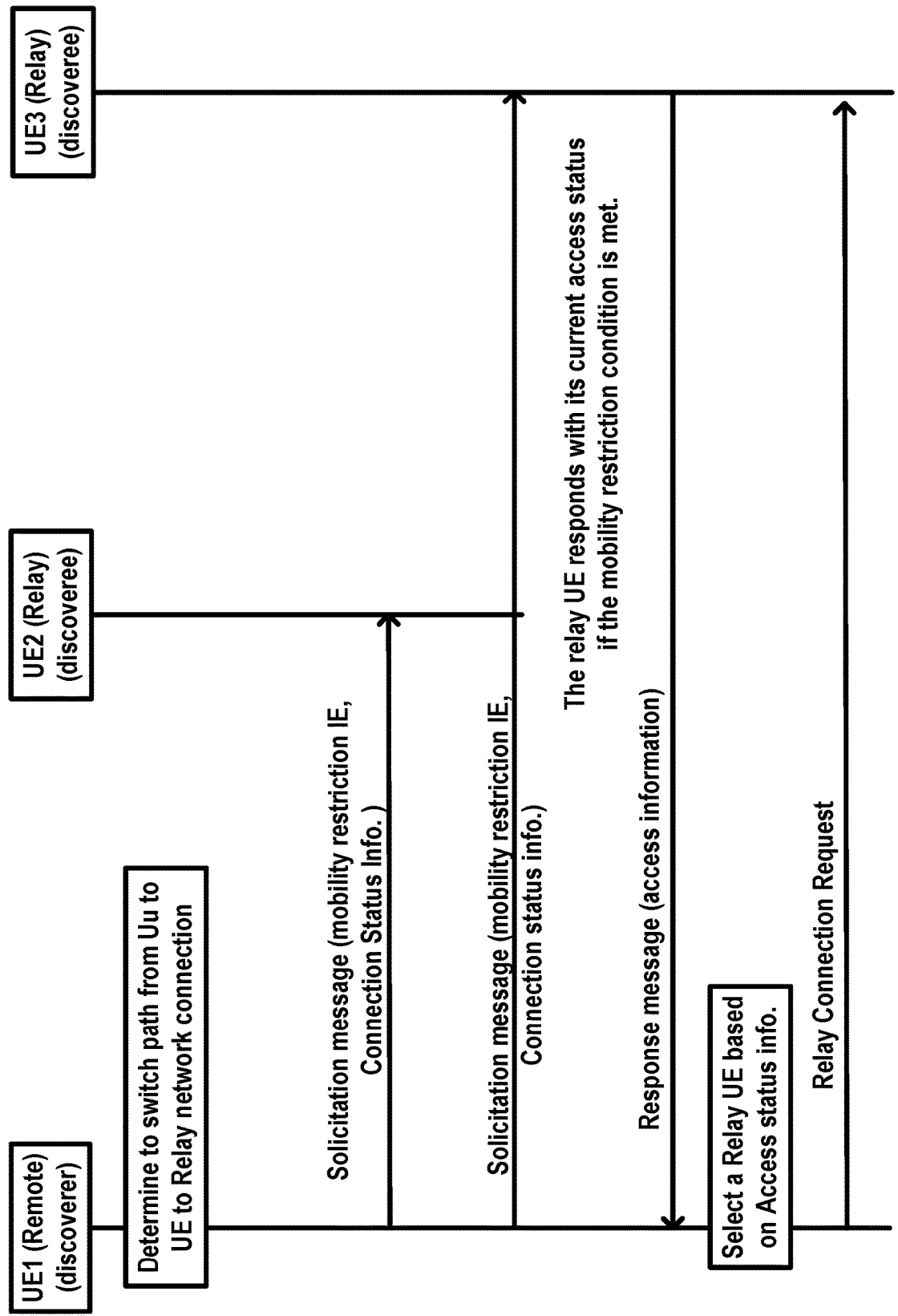
FIG. 24 is an example call flow as per an aspect of an embodiment of the disclosure.

In an example as depicted in FIG. 23 and FIG. 24, the second wireless device (the remote UE, a ProSe UE, and/or the like) may send a discovery solicitation message, a solicitation message, the discovery solicitation message to one or more first wireless devices (relay UEs, UE-to-network relay UEs, and/or the like. FIG. 23 may depict an embodiment of the model B discovery. The second wireless device (the remote UE) may transmit data packets via Uu interface to the network. The remote UE may determine to switch path from Uu to relay path e.g., due to signal strength, out of coverage detection, and/or the like. The remote UE may select a relay UE (the first wireless device) to act as relay node for data transmission to the network. The remote UE may send the solicitation message, the solicitation discovery message, and/or the like to one or more wireless devices. The solicitation discovery message may comprise mobility restriction of the remote UE. In an example, the solicitation discovery message may comprise access status information of the remote UE. The mobility restriction information element may be employed to by the receiving UEs (relay UEs) to determine whether the relay UE may act as relay node for the remote UE based on the restrictions such as access, service, mobility, and/or the like restrictions. The access status information may be employed by the relay UE to determine whether it can provide access for the remote UE to the network based on access requirements derived from the access status information of the remote UE.

In an example as depicted in FIG. 23 and FIG. 24, the relay UE may receive solicitation discovery message from a remote UE. The relay UE may determine to send a response based on an element of the solicitation discovery message. In an example, the response may comprise an access status information of the relay UE. The response may comprise the relay mode mobility restriction of the relay UE. In an example, the response may indicate that based on the mobility restriction received from the remote UE, the relay UE may provide relay connectivity to the remote UE to access the network. In an example, the response may indicate that based on the access status information received from the remote UE, the relay UE may provide relay connectivity to the remote UE to access the network.

In an example embodiment, the first wireless device or the second wireless device may provide mobility restriction during the discovery and solicitation procedures when they are configured with the mobility restrictions. Upon receiving the mobility restriction IE or update of the mobility restrictions, e.g., via a registration accept message, UE configuration update procedure, service request procedure, NAS message, and/or the like, the first wireless device or the second wireless device may determine to release the relay or PC5 connection based on the mobility restrictions.

In an example embodiment, a relay UE (e.g., the first wireless device) may be authorized, configured, and/or the like to act a UE-to-network relay that may override a mobility restriction. For example, when a remote UE sends a request for a relay connection to access the network, the mobility restriction of the relay UE may be overridden to allow access of the remote UE. For example, the mobility restriction of the remote UE may be overridden when the remote UE is accessing the network via the relay UE. In an example, the relay UE may be a special UE such as an acceptable relay UE category, a suitable relay UE category, and/or the like. An acceptable Relay UE may be a relay node/UE via which the remote UE may access/camp to obtain limited service (originate emergency calls and receive ETWS and CMAS notifications). In an example, a relay UE may be a relay node considered as suitable if the relay node/UE is part of either the selected PLMN or the registered PLMN or PLMN of the Equivalent PLMN list of the remote UE, the relay node/UE is configured with or part of at least one TA that is not part of the list of "Forbidden Tracking Areas" of the remote UE, and/or the like.

In an example embodiment, the discovery announce message, the solicitation discovery message, and/or the like may comprise an emergency indication, public safety indication, and/or the like. In an example, the relay UE may receive a relay connection request from a remote UE that may comprise the emergency indication, or the public safety indication. The relay UE upon receiving the indication may allow the connection request. In an example, if the current cell does not allow the remote UE, or the relay UE request, the relay UE may select an acceptable cell or a suitable cell. An acceptable cell may be a cell on which the UE (e.g., the relay UE, remote UE, and/or the like) may camp to obtain limited service (originate emergency calls and receive ETWS and CMAS notifications). Such a cell may fulfil the following requirements, which is the minimum set of requirements to initiate an emergency call and to receive ETWS and CMAS notification in an NR network: the cell is not barred and/or the cell selection criteria are fulfilled. A suitable cell may be considered as suitable if the following conditions are fulfilled: the cell is part of either the selected PLMN or the registered PLMN or PLMN of the Equivalent PLMN list, the cell selection criteria are fulfilled, according to the latest information provided by NAS, the cell is not barred, or the cell is part of at least one TA that is not part of the list of "Forbidden Tracking Areas" which belongs to the PLMN.

Figure 25:
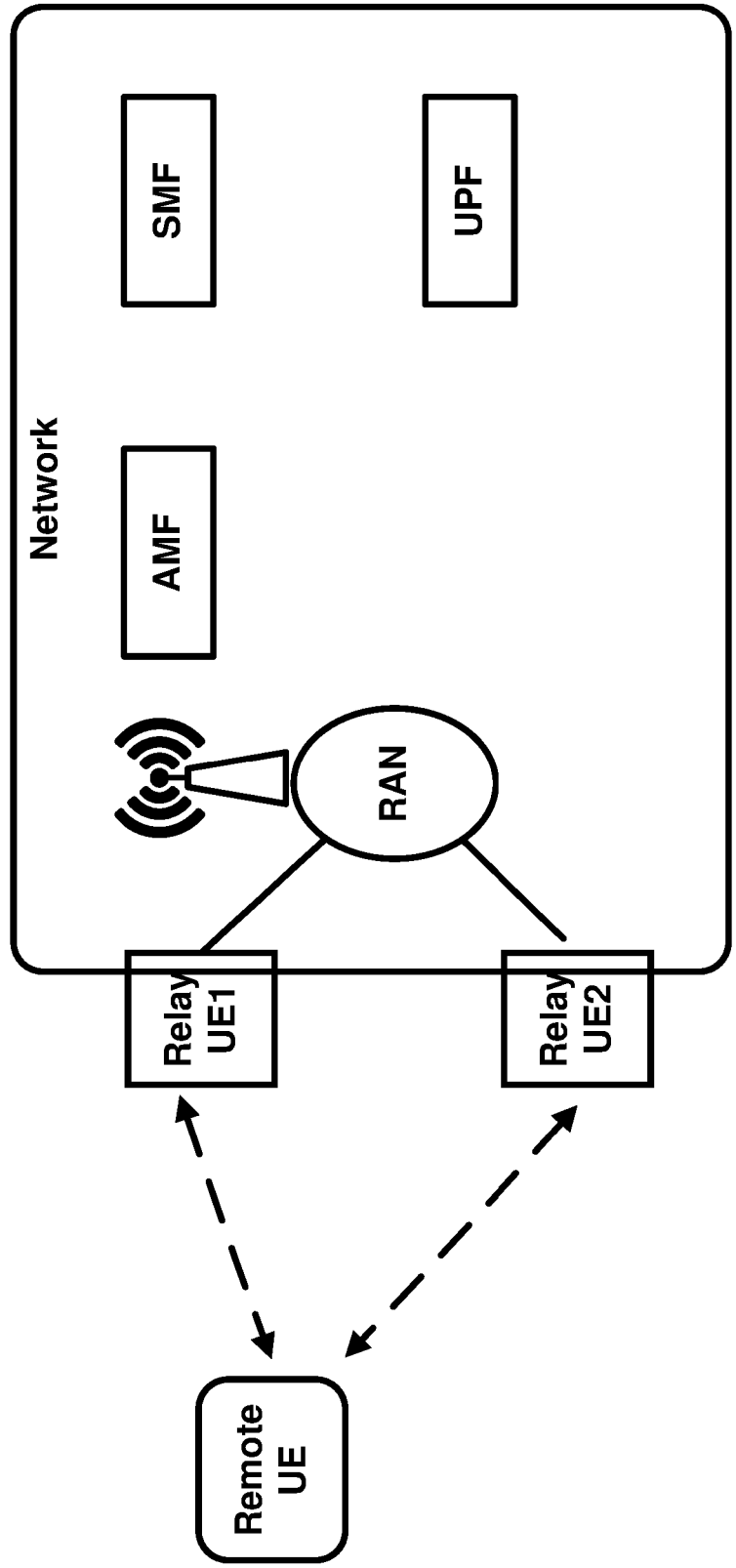
FIG. 25 is an example diagram as per an aspect of an embodiment of the disclosure.

In an example embodiment as depicted in FIG. 25, remote UE may determine to switch path from a first relay UE to a second relay UE. During a discovery announce or solicitation discovery procedure of model A or model B, the remote UE or relay UE may employ access status information and/or mobility restrictions IE to determine a target relay UE for path switch.

Figure 26:
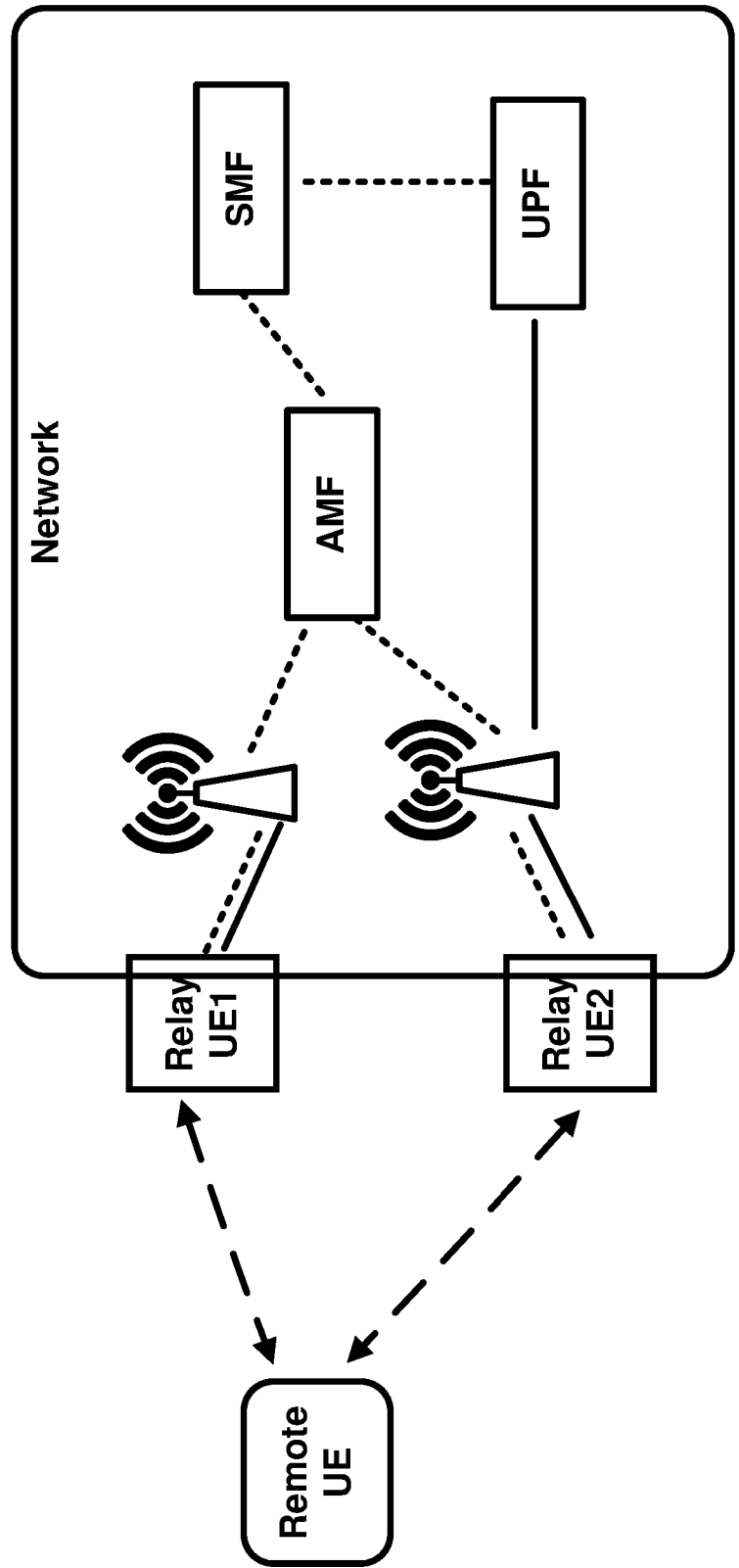
FIG. 26 is an example diagram as per an aspect of an embodiment of the disclosure.

Example FIG. 26, depicts a scenario that the first relay UE and the second relay UE are connected via two different RAN nodes or two different cells of a RAN or PLMN.

Figure 27:
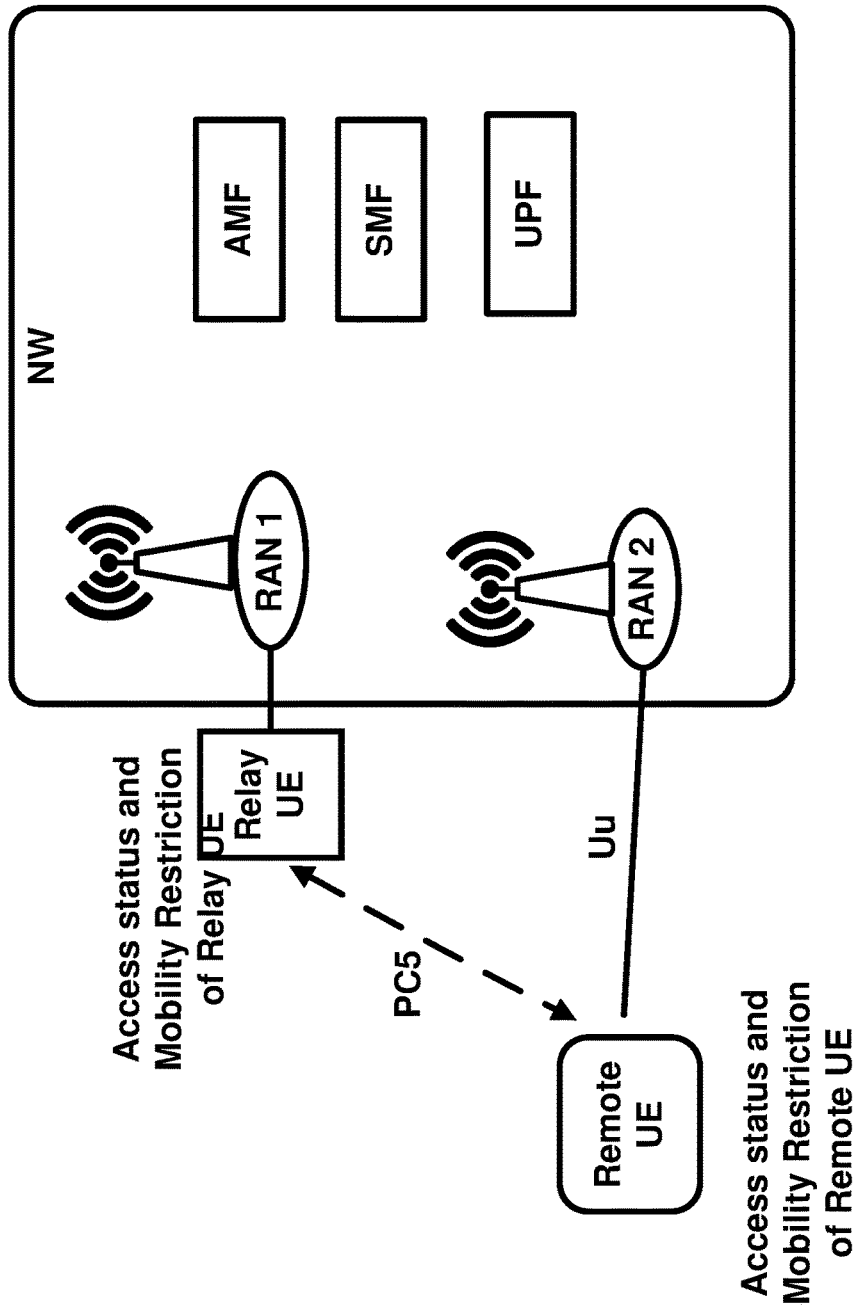
FIG. 27 is an example diagram as per an aspect of an embodiment of the disclosure.

Example FIG. 27 depicts a scenario of a path switch from Uu connection (direct to network) to relay path. The Uu connection may be via a different RAN node or a cell than the RAN node that a relay UE is connecting to. The relay UE and the remote UE may use different RAN nodes.

Figure 28:
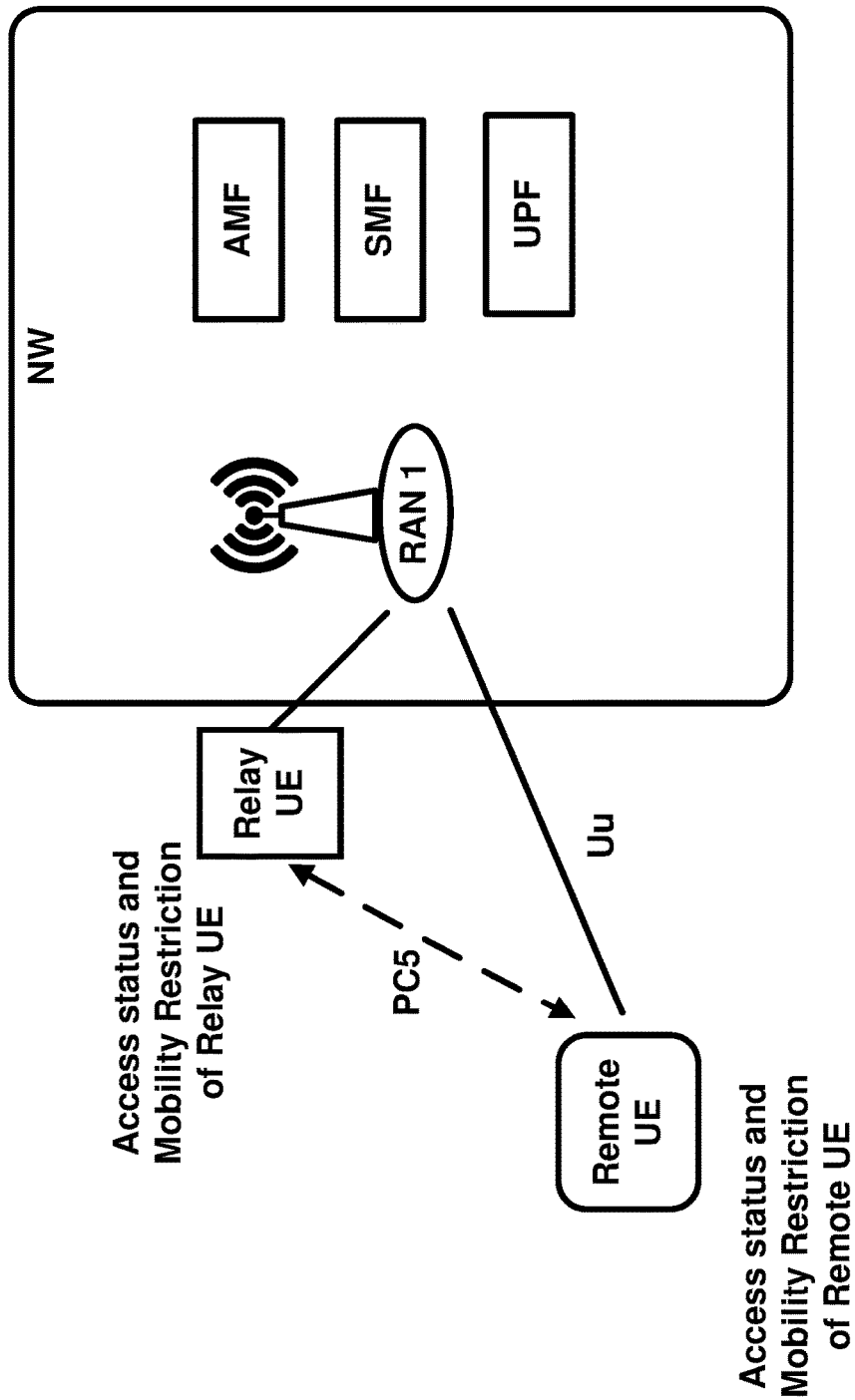
FIG. 28 is an example diagram as per an aspect of an embodiment of the disclosure.

Example FIG. 28 depicts a scenario of a path switch from Uu connection (direct to network) to relay path. The remote UE and the relay UE may use the same RAN node or cell.

In an example embodiment, the mobility restriction information element may comprise one or more closed access group (CAG) identifiers of the UE, radio access type (RAT) restriction, forbidden area, service area restrictions, core network type restriction, and/or the like.

Mobility restrictions may be employed to restrict mobility handling or service access of a UE. The Mobility Restriction functionality may be provided by the UE (for mobility restriction categories provided to the UE), the radio access network and the core network. Service area restrictions and handling of Forbidden Areas for CM-IDLE state and, for CM-CONNECTED state when in RRC Inactive state may be executed by the UE based on information received from the core network. Mobility Restrictions for CM-CONNECTED state when in RRC-Connected state may be executed by the radio access network and the core network. In CM-CONNECTED state, the core network may provide mobility restrictions to the radio access network within mobility restriction list. Mobility restrictions may comprise radio access type (RAT) restriction, Forbidden Area, Service Area Restrictions, Core Network type restriction and Closed Access Group information. RAT restriction may determine the 3GPP radio access technology(ies), a UE is not allowed to access in a PLMN. In a restricted RAT a UE based on subscription is not permitted access to the network for this PLMN. For CM-CONNECTED state, when radio access network determines target RAT and target PLMN during Handover procedure, it should take per PLMN RAT restriction into consideration. The RAT restriction is enforced in the network, and not provided to the UE.

In an example, in a forbidden area, the UE, based on subscription, is not permitted to initiate any communication with the network for a PLMN. The UE behavior in terms of cell selection, RAT selection and PLMN selection may depend on the network response that informs the UE of forbidden area. A forbidden area may apply either to 3GPP access or to non-3GPP access.

In an example, service area restriction may be employed to define areas in which the UE may or may not initiate communication with the network as follows: allowed area wherein the UE is permitted to initiate communication with the network as allowed by the subscription, non-allowed area wherein a UE is service area restricted based on subscription. The UE and the network are not allowed to initiate service request or SM signalling (except for PS Data Off status change reporting) to obtain user services (both in CM-IDLE and in CM-CONNECTED states). The UE may not use the entering of a non-allowed area as a criterion for cell reselection, a trigger for PLMN selection or domain selection for UE originating sessions or calls. The RRC procedures while the UE is in CM-CONNECTED with RRC Inactive state are unchanged compared to when the UE is in an allowed area. The RM procedures are unchanged compared to when the UE is in an Allowed Area. The UE in a Non-Allowed Area may respond to core network paging or NAS Notification message from non-3GPP access with Service Request and RAN paging. In an example, when the services are restricted in 5GS due to service area restriction, then it is assumed that the services will be also restricted in all RATs/Systems at the same location(s) using appropriate mechanisms available in the other RATs/Systems.

In an example, core network type restriction may be employed to determine whether UE is allowed to connect to 5GC only, EPC only, both 5GC and EPC for the PLMN. The Core Network type restriction when received applies in the PLMN either to both 3GPP and non-3GPP Access Types or to non-3GPP Access Type.

In an example, Closed Access Group information may be employed to support public network integrated non-public networks (NPNs). NPNs may be made available via PLMNs e.g. by means of dedicated DNNs, or by one (or more) network slice instances allocated for the NPN. As network slicing may not enable the possibility to prevent UEs from trying to access the network in areas which the UE is not allowed to use the network slice allocated for the NPN, closed access groups may be employed to apply access control. A closed access group may identify a group of subscribers who are permitted to access one or more CAG cells associated to the CAG. CAG may be employed for the Public network integrated NPNs to prevent UE(s), which are not allowed to access the NPN via the associated cell(s), from automatically selecting and accessing the associated cell(s). CAG may be employed for authorization at network/cell selection and may be configured in the subscription as part of the mobility restrictions i.e. independent from any S-NSSAI. A relay UE may be configured with a set of CAG cells or CAG id(s) that are different from those of a remote UE. When a remote UE (e.g., a second wireless device) determines to select a relay UE (a first wireless device) to act as a UE-to-network relay, the relay node selection may be based on the CAG related restrictions. For example, if the remote UE is not allowed to access the network via CAG 1, and the relay UE is connected to CAG 1, the relay UE may not be selected to act as a relay node for the remote UE. In an example, a policy or configuration by the network or an operator may allow access of the remote UE to CAG 1 when a relay node is used. The following may be required for identification of CAGs: A CAG may be identified by a CAG Identifier which is unique within the scope of a PLMN ID, a CAG cell may broadcast one or multiple CAG Identifiers per PLMN. A CAG cell may in addition broadcast a human-readable network name per CAG Identifier. The human-readable network name per CAG Identifier may be employed for presentation to user when user requests a manual CAG selection. To support CAG, the UE may be pre-configured or (re)configured with the following CAG information, included in the subscription as part of the Mobility Restrictions: an Allowed CAG list e.g., a list of CAG Identifiers the UE is allowed to access, a CAG-only indication whether the UE is only allowed to access 5GS via CAG cells, and/or the like.

For a given UE, the core network may determine the mobility restrictions based on UE subscription information, UE location and/or local policy (e.g. if the HPLMN has not deployed 5GC, HPLMN ID of the UE and the operator's policy are used in the VPLMN for determining the Core Network type restriction). The mobility restriction may change due to e.g., UE's subscription, location change and local policy. The service area restrictions or the non-allowed area may be fine-tuned by the PCF e.g., based on UE location, PEI and network policies. Service Area Restrictions may be updated during a registration procedure or UE configuration update procedure. In an example, if the network sends service area restrictions to the UE, the network may send an Allowed Area, or a Non-Allowed Area to the UE. If the UE has received an Allowed Area from the network, any TA not part of the Allowed Area is considered by the UE as non-allowed. If the UE has received a Non-Allowed Area from the network, any TA not part of the Non-Allowed Area is considered by the UE as allowed. If the UE has not received any Service Area Restrictions, any TA in the PLMN is considered as allowed. In an example, if the UE has overlapping areas between Forbidden Areas, Service Area Restrictions, or any combination of them, the UE may evaluate forbidden area or service area restrictions based on a precedence. The UE and the network may override any Forbidden Area, Non-Allowed area restrictions and Core Network type restriction whenever access to the network for regulatory prioritized services like Emergency services and MPS.

In an example, during a relay selection or relay node discovery, the relay node, relay UE, the first wireless device, and/or the like may announce (e.g., via discovery announce message, solicitation message, the solicitation discovery message, the response message, and/or the like) an access status information, e.g., a current access status information. The access status information may comprise a CAG id of a cell that the first wireless device is accessing, whether the first wireless device is a CAG only UE, a tracking area identity, a radio access type that the first wireless device is using, a PLMN ID that the wireless device is accessing, a NPN ID (or a combination of PLMN ID and network id (NID)) that the first wireless device is accessing, an access type of 3GPP access or Non-3GPP access, and/or the like.

In an example, when a remote UE is a CAG only UE, and relay UE is a non CAG UE, the relay UE may allow the relay connection to the network. In an example, based on the operator policy(ies) access of a CAG only UE may or may not be allowed to the network via a normal cell (non-CAG cell) UE. In an example, a remote UE may access a non-public network (NPN) via a relay UE. In an example, when a relay UE is a CAG only UE, based on the network pr operator policies and configuration, the relay UE may or may not be allowed to grant a relay connection to a remote UE that is not a CAG only UE.

Figure 29:
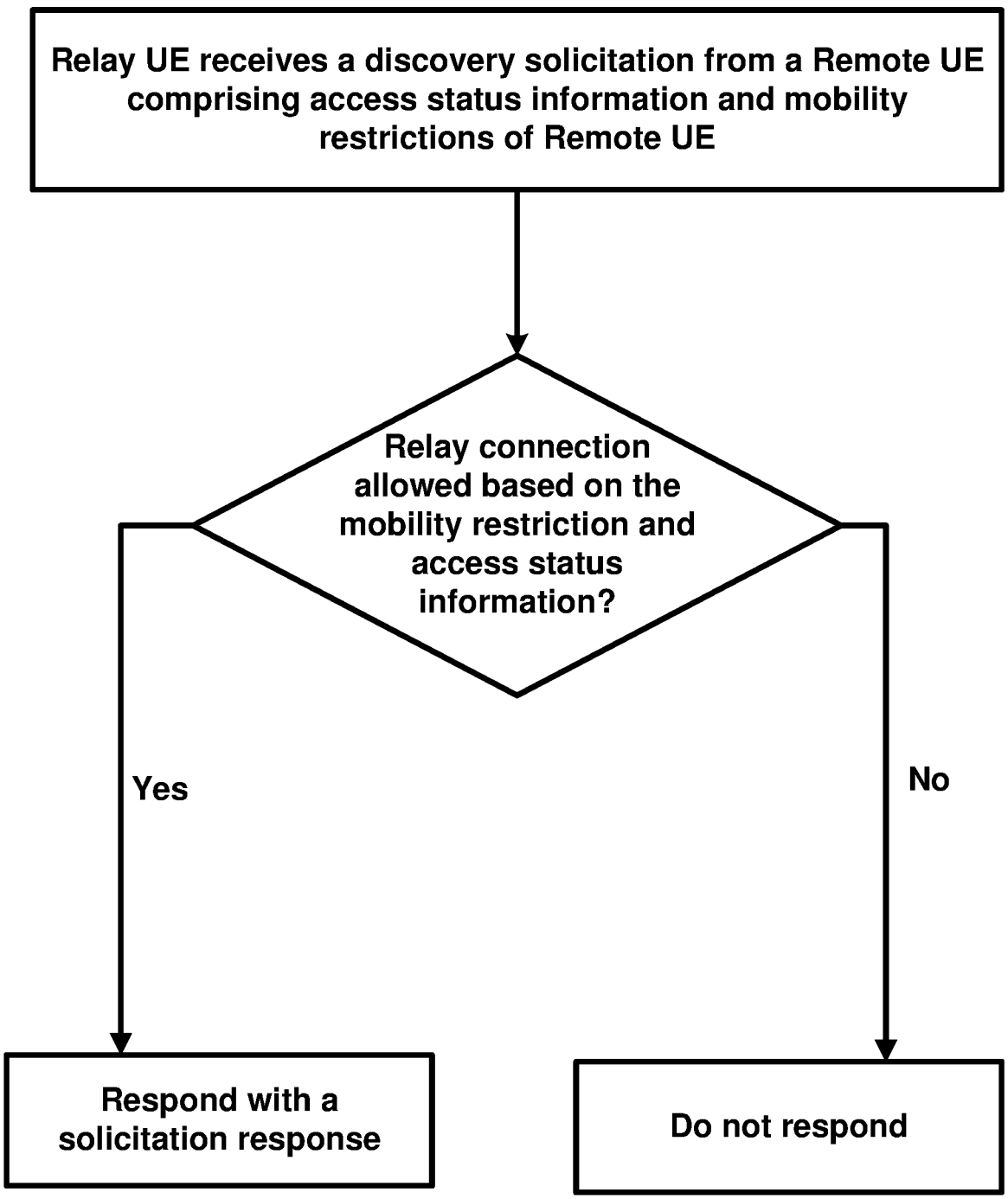
FIG. 29 is an example diagram as per an aspect of an embodiment of the disclosure.

As depicted in example FIG. 29, a relay UE may receive from a remote UE a solicitation message, discovery solicitation, discovery request, and/or the like. The solicitation message may comprise an access status information of the remote UE. The solicitation message may comprise a mobility restriction of the remote UE. The relay UE may determine to respond to the remote UE based on one or more elements of the access status information and/or the mobility restriction of the remote UE and/or of the relay UE.

An embodiment of the present disclosure is depicted in FIG. 30. At 3010, a relay UE may send to a UE a discovery announce message comprising a first access status of the relay UE comprising at least one of a closed access group (CAG) information of the relay UE, a tracking area identity, a radio access type (RAT), and/or the like. At 3020, the relay UE may receive from the UE, a connection request message based on matching an element of the first access status of the relay UE and a mobility restriction of the UE, to establish a connection with a network via the relay UE.

An embodiment of the present disclosure is depicted in FIG. 31. At 3110, a UE may send to a relay UE, a solicitation message to establish a connection with a network via the relay UE, the solicitation message comprising a second mobility restriction information of the UE comprising at least one of one or more closed access group (CAG) identifiers of the UE, radio access type (RAT) restriction, forbidden area, service area restrictions, core network type restriction, and/or the like. At 3120, the UE may receive from the relay UE, a response message based on matching the second mobility restriction of the UE and a first mobility restriction of the relay UE.

In an example embodiment, a relay UE may send to a UE, a discovery announce message comprising a first access status of the relay UE comprising at least one of a closed access group (CAG) information of the relay UE, a tracking area identity, a radio access type (RAT), and/or the like. The relay UE may receive from the UE a connection request message based on matching an element of the first access status of the relay UE and a mobility restriction of the UE, to establish a connection with a network via the relay UE. The first access status may comprises a PLMN identifier. The mobility restriction may comprise one or more closed access group (CAG) identifiers of the UE, radio access type (RAT) restriction, forbidden area, service area restrictions, core network type restriction, and/or the like. The access status of the relay UE may comprise a mobility restriction of the relay UE. The relay UE may receive from an access and mobility management function, a first mobility restriction of the relay UE. The relay UE may receive from an access and mobility management function, a mobility restriction of the UE. The discovery announce message may comprise a mobility restriction of the relay UE. The connection request may comprise the mobility restriction of the UE. The discovery announce message may comprise a mobility restriction of the relay UE. The discovery announce message may further comprise a ProSe Relay UE ID comprising an identifier of the relay UE, an announcer information, a relay service code, and/or the like. The ProSe Relay UE ID may comprise a link layer identifier that is used for direct communication and is associated with a Relay Service Code. The relay service code may comprise a parameter that identifies a connectivity service of a ProSe relay UE.

In an example embodiment, a UE may receive from a relay UE a discovery announce message comprising a first access status of the relay UE comprising at least one of a closed access group (CAG) information of the relay UE, a tracking area identity, a radio access type (RAT), and/or the like. The UE may send to the relay UE, a connection request message based on matching an element of the first access status of the relay UE and a mobility restriction of the UE, to establish a connection with a network via the relay UE. The UE may send to the relay UE, a relay connection request, to establish the connection with a network via the relay UE, based on an element of the discovery announce message. The UE may determine to switch path from a Uu connection to a relay path. The discovery announce message may comprise a mobility restriction of the relay UE. The discovery announce message may further comprise a ProSe Relay UE ID comprising an identifier of the relay UE, an announcer information, a relay service code, and/or the like. The ProSe Relay UE ID may comprise a link layer identifier that is used for direct communication and is associated with a Relay Service Code. The relay service code may comprise a parameter that identifies a connectivity service of a ProSe relay UE.

In an example embodiment, a relay UE may receive from a UE, a solicitation message to establish a connection with a network via the relay UE, the solicitation message may comprise a second access status of the UE comprising at least one of a closed access group (CAG) information of the relay UE, a tracking area identity, a radio access type (RAT). The relay UE may send to the UE, a response message based on matching the second access status of the UE and a first access status of the relay UE. The solicitation message may comprise a second mobility restriction information of the UE comprising at least one of one or more closed access group (CAG) identifiers of the UE, radio access type (RAT) restriction, forbidden area, a validity time/period of mobility restriction, service area restrictions, core network type restriction, and/or the like. The second access status of the of the UE may comprise a second mobility restriction of the UE. The second mobility restriction may comprise at least one of one or more closed access group (CAG) identifiers of the UE, radio access type (RAT) restriction, forbidden area, a validity time/period of mobility restriction, service area restrictions, core network type restriction. The solicitation message may comprise a discoverer information comprising information about the UE (remote UE), a relay service code comprising information about connectivity that a discoverer UE is interested in, a UE identifier, and/or the like. The response message may be a solicitation response (discovery response) message. The solicitation response message may comprise an identifier of the relay UE, a parameter comprising a set of information about the relay UE, and/or the like.

In an example embodiment, a UE may send to a relay UE, a solicitation message to establish a connection with a network via the relay UE. The solicitation message may comprise a second mobility restriction information of the UE comprising at least one of: one or more closed access group (CAG) identifiers of the UE, radio access type (RAT) restriction, forbidden area, service area restrictions, core network type restriction, and/or the like. The UE may receive from the relay UE, a response message based on matching the second mobility restriction of the UE and a first mobility restriction of the relay UE. The solicitation message may comprise a discoverer information comprising information about the UE (remote UE), a relay service code comprising information about connectivity that a discoverer UE is interested in, a UE identifier, and/or the like. The response message may be a solicitation response (discovery response) message. The solicitation response message may comprise an identifier of the relay UE, a parameter comprising a set of information about the relay UE, and/or the like. The UE may send to the network, a registration request message. The UE may receive from the network, a registration accept message comprising the second mobility restriction information of the UE. The UE may determine to switch path from Uu to relay for transmission of data packets. The determining may be based on the UE being out of coverage for Uu connection. The solicitation message may comprise a second access status of the UE comprising at least one of a closed access group (CAG) information of the UE, a tracking area identity, a radio access type (RAT), and/or the like. The response message may comprise a first access status of the relay UE comprising at least one of: a closed access group (CAG) information of the relay UE, a tracking area identity, a radio access type (RAT), and/or the like. The UE may select the relay UE based on the first access status of the relay UE. The response message may comprise a first mobility restriction of the relay UE comprising: one or more closed access group (CAG) identifiers of the relay UE, radio access type (RAT) restriction, forbidden area, service area restrictions, core network type restriction, and/or the like. The UE may select the relay UE based on the first mobility restriction of the relay UE. The UE may send to the relay UE, a connection setup request. The connection setup request may be a PC5 connection request. The UE may receive from the relay UE, a connection setup response indicating that the path switch to relay UE is successful. The UE may send to the relay UE data packets. The UE may establish a connection to the network via a layer 2 relay communication. The UE may establish a connection to the network via a layer 3 relay communication. The UE may determine to switch path from relay to Uu. The UE may select a cell based on an element of the first access status of the UE, the first mobility restriction of the UE, and/or the like.

In an example embodiment, a relay UE may send a discovery announce message. The discovery announce message may comprise an access status information (the access status information) of the relay UE. The access status information may comprise current access network, current access type, current CAG cell, tracking area, and/or the like. In an example, the relay UE may send the mobility restrictions of the relay UE via the discovery announce message. In an example, a remote UE may respond to the relay UE. The response may be a discovery response message, a discovery announce response, and/or the like. The response message may comprise the access status information of the remote UE. The response message may comprise the mobility restriction of the UE. The relay UE may determine to accept the relay connection request. The remote UE may determine to send a response message based on the access status information and/or the mobility restriction of the relay UE and/or of the remote UE.

In an example embodiment, the remote UE may send a solicitation message or discovery solicitation message. The solicitation message may comprise the access status information of the remote UE. The solicitation message may comprise the mobility restriction of the UE. The relay UE may send a response message that may comprise the mobility restriction of the relay UE. The response message may comprise the access status information of the relay UE. The relay UE may determine whether or not to respond. The determining may be based on elements of the access status information of the relay UE and/or remote UE. The remote UE may determine whether to send a relay connection request to the relay UE that has responded. The determining may be based on at least one element of the mobility restriction of the relay UE and/or the remote UE. The determining may be based on at least one element of the access status information of the relay UE and/or the remote UE.

In an example embodiment, provisioning of the mobility restrictions from the relay UE to the remote UE or from the remote UE to the relay UE may be conditional (conditional provisioning) based on a condition that the relay UE or the remote UE is configured with mobility restrictions. The condition may comprise a scenario that an access status information of the relay UE or the remote UE indicates a connectivity via a CAG cell, or the UE be a CAG only UE. In an example, the condition may be based on the UE being in a geographic area, a restricted area, connected via a cell with a specific cell ID, being connected to the network via a specific RAT type, and/or the like.

In an example embodiment, a relay UE may override the mobility restrictions (or a subset the mobility restrictions) of the remote UE. The relay UE may be allowed to provide relay or ProSe services to the remote UE based on the mobility restrictions and configurations of the relay UE. In an example, the access status of the remote UE may be modified if allowed by the mobility restrictions. For example, if relay UE and remote UE are both allowed to access CAG 1 and CAG 2, and relay UE is connected via CAG 1 and the remote UE Uu access is via CAG 2, the relay UE may notify the remote UE and allow the relay connection. The remote UE may perform a PDU session modification or a service request procedure and include CAG 1 in the NAS message. The relay UE may be overridden by the remote UE; for example, the relay UE may modify or establish a PDU session with CAG 2 or perform an RRC connection establishment based on the CAG 2 (of the remote UE).

In an example embodiment, for RAT restriction, a UE-to-Network Relay or Remote UE may not use NR PC5 if it is restricted (with RAT restriction) to use NR. For forbidden area a UE-to-Network Relay or Remote UE may not use NR PC5 if it is in a Forbidden Area. A UE-to-Network Relay may indicate to remote UEs the Tracking Area of the cell to which the UE-to-Network Relay is connected. For service area restriction, allowed area, and non-allowed area, allowed area may apply as is for a UE-to-Network Relay and Remote UE. A UE-to-Network Relay (resp. Remote UE) may be allowed to initiate communication with the network (resp. with the network via a UE-to-Network Relay) as allowed by subscription. A UE-to-Network Relay may operate a PC5 relay in an Allowed Area. Non-allowed area may apply as is for a UE-to-Network Relay and Remote UE. The UE (UE-to-Network Relay or Remote UE) and the network are not allowed to initiate Service Request or SM signaling to obtain user services (e.g., in CM-IDLE and in CM-CONNECTED states). For core network type restriction, the CN type restriction may apply as is to a UE-to-Network Relay and Remote UE. A UE-to-Network Relay or Remote UE may operate as such when not restricted to use 5GC. For closed access group information, a UE may be permitted (resp. not permitted) to access a CAG cell may be (implicitly) permitted (resp. not permitted) to access this CAG cell as a Remote UE via a UE-to-Network Relay. The Allowed CAG list and CAG-only indication of a UE may apply to this UE when it is a Remote UE. A UE permitted (resp. not permitted) to access a CAG cell may be (implicitly) permitted (resp. not permitted) to access this CAG cell as a UE-to-Network Relay. The Allowed CAG list and CAG-only indication of a UE may apply to this UE when it operates as a UE-to-Network Relay. A UE-to-Network Relay may indicate to Remote UEs the CAG identifiers of the CAG the UE-to-Network Relay is permitted to access via the cell to which it is connected.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
    receiving, by a first wireless device from a second wireless device, a discovery solicitation message comprising access status information of the second wireless device, wherein the access status information comprises an indication that the second wireless device is a closed access group (CAG) only wireless device;
    transmitting, by the first wireless device to the second wireless device, a discovery message comprising a non-public network (NPN) identifier of an NPN to which the first wireless device can provide access,
    wherein the first wireless device is a non-CAG wireless device, and
    wherein the indication is based on access requirements derived from the access status information of the second wireless device, the access requirements comprising that the second wireless device is the CAG only wireless device.

2. The method of claim 1, further comprising connecting, by the first wireless device to a network via a base station.

3. The method of claim 2, wherein the connecting is before the transmitting the discovery message.

4. The method of claim 1, wherein the first wireless device is a relay wireless device, and the second wireless device is a remote wireless device.

5. The method of claim 1, wherein the discovery message is a discovery announce message comprising an identifier of the first wireless device.

6. The method of claim 5, wherein the identifier of the first wireless device is a ProSe relay user equipment identifier of the first wireless device.

7. The method of claim 1, further comprising receiving, by the first wireless device from the second wireless device, a connection request for a connection.

8. The method of claim 7, further comprising establishing, by the first wireless device based on the connection request, the connection with the second wireless device.

9. The method of claim 7, further comprising receiving, by the first wireless device from the second wireless device, one or more packets via the connection.

10. The method of claim 9, further comprising transmitting, by the first wireless device to a base station, the one or more packets.

11. A first wireless device comprising:
    one or more processors; and
    memory storing instructions that, when executed by the one or more processors, cause the first wireless device to:
        receive, from a second wireless device, a discovery solicitation message comprising access status information of the second wireless device, wherein the access status information comprises an indication that the second wireless device is a closed access group (CAG) only wireless device;
        transmit, to the second wireless device, a discovery message comprising a non-public network (NPN) identifier of an NPN to which the first wireless device can provide access,
        wherein the first wireless device is a non-CAG wireless device, and
        wherein the indication is based on access requirements derived from the access status information of the second wireless device, the access requirements comprising that the second wireless device is the CAG only wireless device.

12. The first wireless device of claim 11, wherein the instructions further cause the first wireless device to connect to a network via a base station.

13. The first wireless device of claim 12, wherein the instructions further cause the first wireless device to connect before the transmitting the discovery message.

14. The first wireless device of claim 11, wherein the first wireless device is a relay wireless device, and the second wireless device is a remote wireless device.

15. The first wireless device of claim 11, wherein the discovery message is a discovery announce message comprising an identifier of the first wireless device.

16. The first wireless device of claim 15, wherein the identifier of the first wireless device is a ProSe relay user equipment identifier of the first wireless device.

17. The first wireless device of claim 11, wherein the instructions further cause the first wireless device to receive from the second wireless device, a connection request for a connection.

18. The first wireless device of claim 17, wherein the instructions further cause the first wireless device to establish, based on the connection request, the connection with the second wireless device.

19. The first wireless device of claim 17, wherein the instructions further cause the first wireless device to:
    receive, from the second wireless device, one or more packets via the connection; and
    transmit, to a base station, the one or more packets.

20. A non-transitory computer-readable medium storing instructions that, when executed by a first wireless device, cause the first wireless device to:
    receive, from a second wireless device, a discovery solicitation message comprising access status information of the second wireless device, wherein the access status information comprises an indication that the second wireless device is a closed access group (CAG) only wireless device;
    transmit, to the second wireless device, a discovery message comprising a non-public network (NPN) identifier of an NPN to which the first wireless device can provide access,
    wherein the first wireless device is a non-CAG wireless device, and
    wherein the indication is based on access requirements derived from the access status information of the second wireless device, the access requirements comprising that the second wireless device is the CAG only wireless device.

* * * * *